United States Patent
Gow et al.

(10) Patent No.: US 10,857,844 B2
(45) Date of Patent: Dec. 8, 2020

(54) TIRE PARAMETER MONITORING SYSTEM

(71) Applicant: Infineon Technologies AG, Neubiberg (DE)

(72) Inventors: Felix Gow, Singapore (SG); Lifeng Guan, Singapore (SG)

(73) Assignee: Infineon Technologies AG, Neubiberg (DE)

( * ) Notice: Subject to any disclaimer, the term of this patent is extended or adjusted under 35 U.S.C. 154(b) by 311 days.

(21) Appl. No.: 14/996,506

(22) Filed: Jan. 15, 2016

(65) Prior Publication Data
US 2017/0203619 A1    Jul. 20, 2017

(51) Int. Cl.
*B60C 23/04* (2006.01)

(52) U.S. Cl.
CPC ...... *B60C 23/0416* (2013.01); *B60C 23/0437* (2013.01); *B60C 23/0462* (2013.01); *B60C 23/0483* (2013.01)

(58) Field of Classification Search
USPC .... 340/447, 442, 445, 5.61, 13.26, 438, 459
See application file for complete search history.

(56) References Cited

U.S. PATENT DOCUMENTS

| | | | |
|---|---|---|---|
| 6,441,728 B1 * | 8/2002 | Dixit | B60C 23/0416 340/442 |
| 6,469,621 B1 * | 10/2002 | Vredevoogd | B60C 23/0408 340/442 |
| 6,535,116 B1 * | 3/2003 | Zhou | B60C 23/009 340/438 |
| 6,920,785 B2 * | 7/2005 | Toyofuku | B60C 23/0416 340/442 |
| 7,173,520 B2 * | 2/2007 | Desai | B60C 23/0416 340/442 |
| 7,348,878 B2 | 3/2008 | Fogelstrom | |
| 7,741,963 B2 * | 6/2010 | Tsai | B60C 23/0408 340/442 |
| 7,990,257 B2 * | 8/2011 | Loehndorf | B60C 23/0416 340/447 |
| 8,368,524 B2 * | 2/2013 | Oda | B60C 23/0462 340/442 |
| 8,776,589 B1 * | 7/2014 | Brown | B60C 23/0498 73/146 |
| 8,789,412 B2 * | 7/2014 | Kanenari | B60C 23/0408 73/146.2 |
| 8,798,853 B2 * | 8/2014 | Kanenari | B60C 23/007 701/33.4 |
| 8,862,313 B2 * | 10/2014 | Brey | G07C 5/08 701/31.5 |
| 8,890,670 B2 * | 11/2014 | Brey | B60T 7/16 340/431 |
| 9,340,075 B2 * | 5/2016 | Guan | B60C 23/0455 |
| 9,757,995 B2 * | 9/2017 | Stein | B60B 7/04 |

(Continued)

FOREIGN PATENT DOCUMENTS

| CN | 101574909 A | 11/2009 |
|---|---|---|
| CN | 102910041 A | 2/2013 |

(Continued)

*Primary Examiner* — Fekadeselassie Girma
(74) *Attorney, Agent, or Firm* — Eschweiler & Potashnik, LLC

(57) ABSTRACT

A tire parameter monitoring system comprising at least two RF repeaters, wherein each of the at least two RF repeaters is dedicated to an individual sensor unit of at least two sensor units.

21 Claims, 18 Drawing Sheets

(56) References Cited

U.S. PATENT DOCUMENTS

| | | | |
|---|---|---|---|
| 9,757,996 B2* | 9/2017 | Uh | B60C 23/009 |
| 2002/0063623 A1* | 5/2002 | Juzswik | B60C 23/0408 |
| | | | 340/442 |
| 2003/0227379 A1* | 12/2003 | Itou | B60C 23/0472 |
| | | | 340/442 |
| 2004/0233855 A1* | 11/2004 | Gutierrez | H04L 45/00 |
| | | | 370/252 |
| 2005/0151634 A1* | 7/2005 | Tsuji | B60C 23/0442 |
| | | | 340/445 |
| 2006/0048567 A1* | 3/2006 | Shimura | B60C 23/0462 |
| | | | 73/146.5 |
| 2006/0071693 A1* | 4/2006 | Higuchi | B60C 23/045 |
| | | | 327/108 |
| 2006/0103240 A1* | 5/2006 | Naito | B60R 25/24 |
| | | | 307/10.1 |
| 2006/0173608 A1* | 8/2006 | Shimura | F02D 41/266 |
| | | | 701/114 |
| 2006/0176163 A1* | 8/2006 | Choi | B60C 23/0408 |
| | | | 340/444 |
| 2006/0250227 A1 | 11/2006 | Naito | |
| 2007/0052527 A1 | 3/2007 | Song et al. | |
| 2007/0069877 A1* | 3/2007 | Fogelstrom | B60C 23/0408 |
| | | | 340/442 |
| 2007/0080795 A1 | 4/2007 | Ichikawa | |
| 2008/0042817 A1* | 2/2008 | Fogelstrom | B60C 23/0408 |
| | | | 340/442 |
| 2008/0094196 A1* | 4/2008 | Liao | B60C 23/0494 |
| | | | 340/447 |
| 2008/0265711 A1* | 10/2008 | Kumar | G01L 9/0025 |
| | | | 310/313 B |
| 2009/0058625 A1 | 3/2009 | Suzuki | |
| 2009/0060092 A1* | 3/2009 | Higuchi | B60C 23/045 |
| | | | 375/318 |
| 2009/0066496 A1* | 3/2009 | Nantz | B60C 23/0408 |
| | | | 340/442 |
| 2009/0102636 A1* | 4/2009 | Tranchina | B60C 23/0408 |
| | | | 340/447 |
| 2009/0179749 A1* | 7/2009 | Huang | B60C 23/0442 |
| | | | 340/447 |
| 2010/0090820 A1* | 4/2010 | Oba | B60C 23/0462 |
| | | | 340/447 |
| 2010/0225464 A1* | 9/2010 | Oda | H04Q 9/00 |
| | | | 340/459 |
| 2010/0271191 A1* | 10/2010 | de Graff | B60C 23/0408 |
| | | | 340/447 |
| 2010/0283593 A1* | 11/2010 | Miller | G08B 5/36 |
| | | | 340/447 |
| 2011/0043354 A1* | 2/2011 | Shepler | B60C 23/0408 |
| | | | 340/447 |
| 2011/0248819 A1* | 10/2011 | Saito | H01Q 1/3241 |
| | | | 340/5.64 |
| 2011/0299638 A1* | 12/2011 | Gauthier | H04L 25/061 |
| | | | 375/343 |
| 2013/0176176 A1* | 7/2013 | Vos | H01Q 1/38 |
| | | | 343/700 MS |
| 2013/0278406 A1 | 10/2013 | Weston | |
| 2014/0111326 A1* | 4/2014 | Borisenko | B60C 23/0454 |
| | | | 340/447 |
| 2014/0129054 A1* | 5/2014 | Huntzicker | G06F 17/00 |
| | | | 701/2 |
| 2014/0201064 A1* | 7/2014 | Jackson | G08G 1/0175 |
| | | | 705/38 |
| 2014/0292581 A1* | 10/2014 | Orlik | G01S 5/02 |
| | | | 342/417 |
| 2015/0002266 A1* | 1/2015 | Brillon | G07C 9/28 |
| | | | 340/5.72 |
| 2015/0054617 A1* | 2/2015 | Fontanet | H03K 17/962 |
| | | | 340/5.72 |
| 2015/0061853 A1* | 3/2015 | Yu | B60C 23/009 |
| | | | 340/445 |
| 2015/0116085 A1* | 4/2015 | Juzswik | G07C 9/28 |
| | | | 340/5.72 |
| 2015/0145648 A1* | 5/2015 | Winkelman | B60R 25/24 |
| | | | 340/5.72 |
| 2015/0165835 A1 | 6/2015 | Peine | |
| 2015/0191056 A1* | 7/2015 | Mori | B60C 23/0488 |
| | | | 73/146.5 |
| 2015/0193996 A1* | 7/2015 | Van Wiemeersch | G06Q 10/08 |
| | | | 340/5.72 |
| 2015/0239306 A1* | 8/2015 | Bracq | B60C 23/0479 |
| | | | 702/140 |
| 2015/0314752 A1* | 11/2015 | Shigetomi | B60R 25/34 |
| | | | 340/426.18 |
| 2015/0321640 A1* | 11/2015 | Hisada | B60C 23/04 |
| | | | 340/426.2 |
| 2015/0367692 A1* | 12/2015 | Guan | B60C 23/0471 |
| | | | 340/447 |
| 2016/0031272 A1* | 2/2016 | Peine | B60C 23/0493 |
| | | | 340/442 |
| 2016/0039365 A1* | 2/2016 | Vanderwall | B60C 23/0477 |
| | | | 701/36 |
| 2016/0101728 A1* | 4/2016 | Chan | B60Q 9/00 |
| | | | 340/447 |
| 2016/0114636 A1* | 4/2016 | Terada | B60C 23/0489 |
| | | | 73/146.5 |
| 2016/0146279 A1* | 5/2016 | Philpott | B60T 8/885 |
| | | | 188/1.11 L |
| 2016/0207363 A1* | 7/2016 | Sogabe | B60C 23/0472 |
| 2016/0215833 A1* | 7/2016 | Robert | H01L 35/32 |
| 2016/0221403 A1* | 8/2016 | Uh | B60C 23/009 |
| 2016/0229236 A1* | 8/2016 | Taki | B60C 23/0416 |
| 2016/0229239 A1* | 8/2016 | Taki | B60C 23/0489 |
| 2016/0236522 A1* | 8/2016 | Taki | B60C 23/0415 |
| 2016/0243905 A1* | 8/2016 | McIntyre | H04L 67/12 |
| 2016/0267724 A1* | 9/2016 | Liu | B60K 35/00 |
| 2016/0280017 A1* | 9/2016 | Stein | B60C 23/04 |
| 2016/0311273 A1* | 10/2016 | Zaroor | B60C 23/0479 |
| 2016/0352533 A1* | 12/2016 | Talty | H04W 4/48 |
| 2017/0166019 A1* | 6/2017 | Singh | B60C 23/0408 |
| 2017/0166020 A1* | 6/2017 | Shin | B60C 23/0474 |
| 2017/0169636 A1* | 6/2017 | Piche | G07C 9/33 |
| 2017/0203619 A1* | 7/2017 | Gow | B60C 23/0416 |
| 2017/0210185 A1* | 7/2017 | Sekizawa | B60C 23/0488 |
| 2017/0305212 A1* | 10/2017 | Lin | B60C 23/0442 |
| 2017/0326928 A1* | 11/2017 | Oomi | G01L 17/00 |
| 2017/0345240 A1* | 11/2017 | Bergerhoff | H04M 1/72533 |
| 2018/0022171 A1* | 1/2018 | Okada | B60C 23/0416 |
| | | | 701/33.4 |
| 2018/0050571 A1* | 2/2018 | Usami | B60C 23/0461 |
| 2018/0056735 A1* | 3/2018 | Usami | B60C 23/0461 |
| 2018/0065428 A1* | 3/2018 | Kandler | B60C 23/0481 |
| 2018/0111429 A1* | 4/2018 | Matsuoka | B60C 23/0416 |
| 2018/0154866 A1* | 6/2018 | Sute | B60R 25/406 |

FOREIGN PATENT DOCUMENTS

| | | |
|---|---|---|
| CN | 104943483 A | 9/2015 |
| DE | 19608479 A1 | 5/1997 |
| JP | 2002536235 A | 10/2002 |
| JP | 2003002019 A | 1/2003 |
| WO | 01/81104 A1 | 11/2001 |
| WO | 2009070063 A1 | 6/2009 |

* cited by examiner

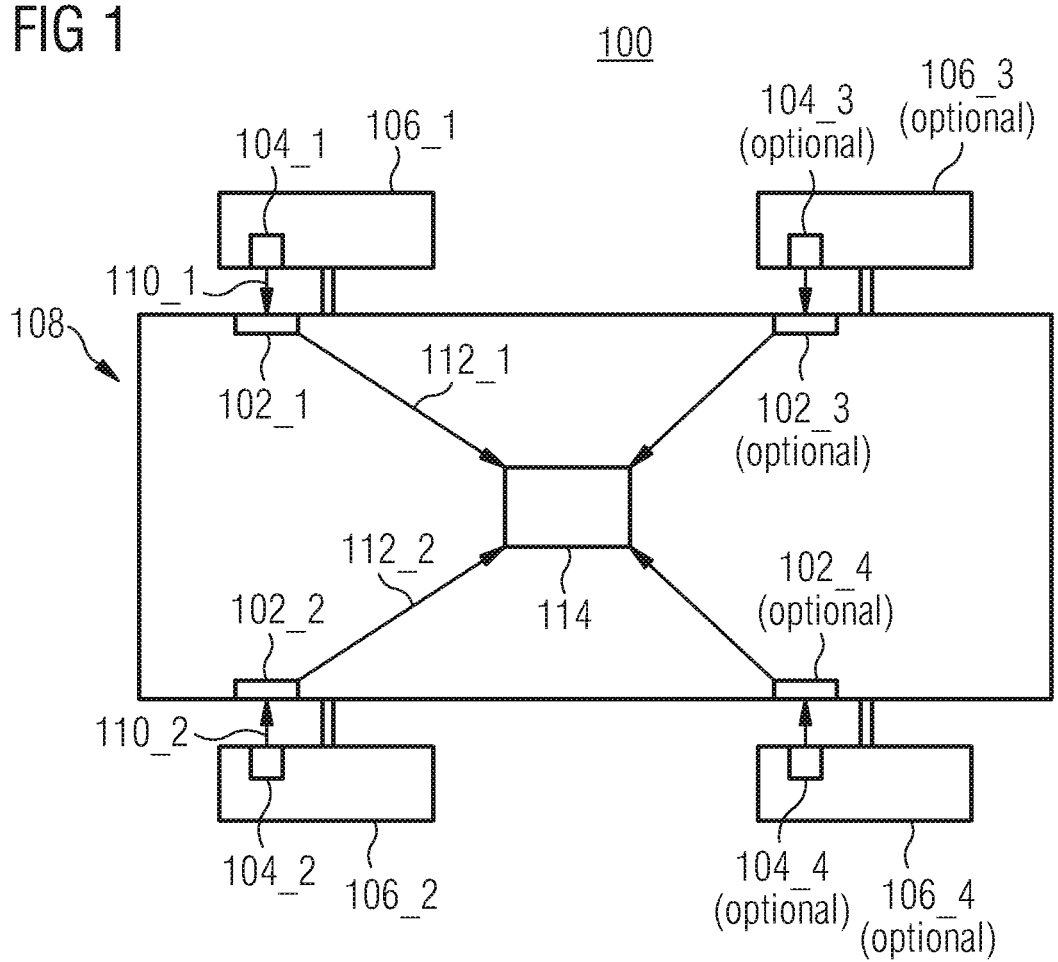

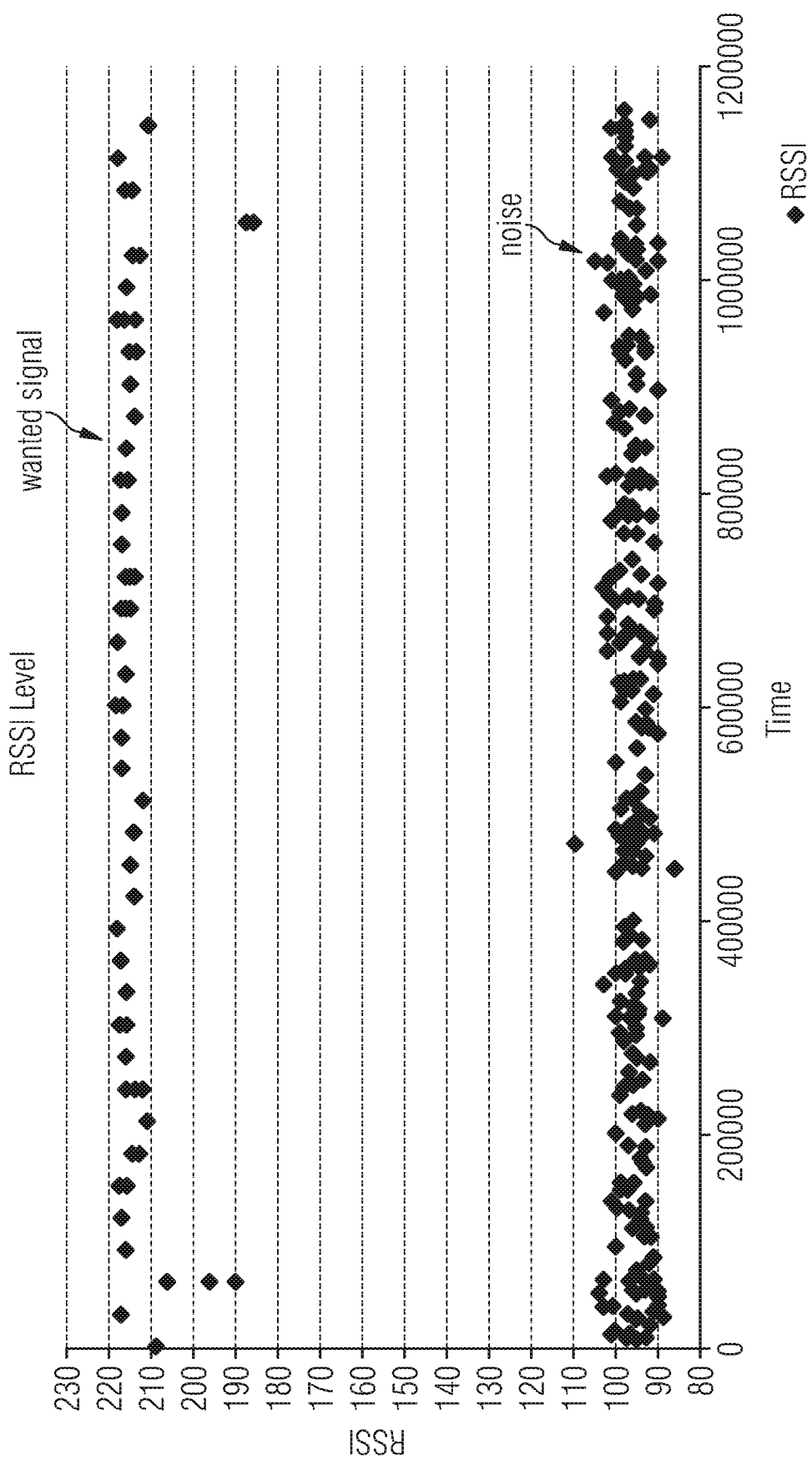

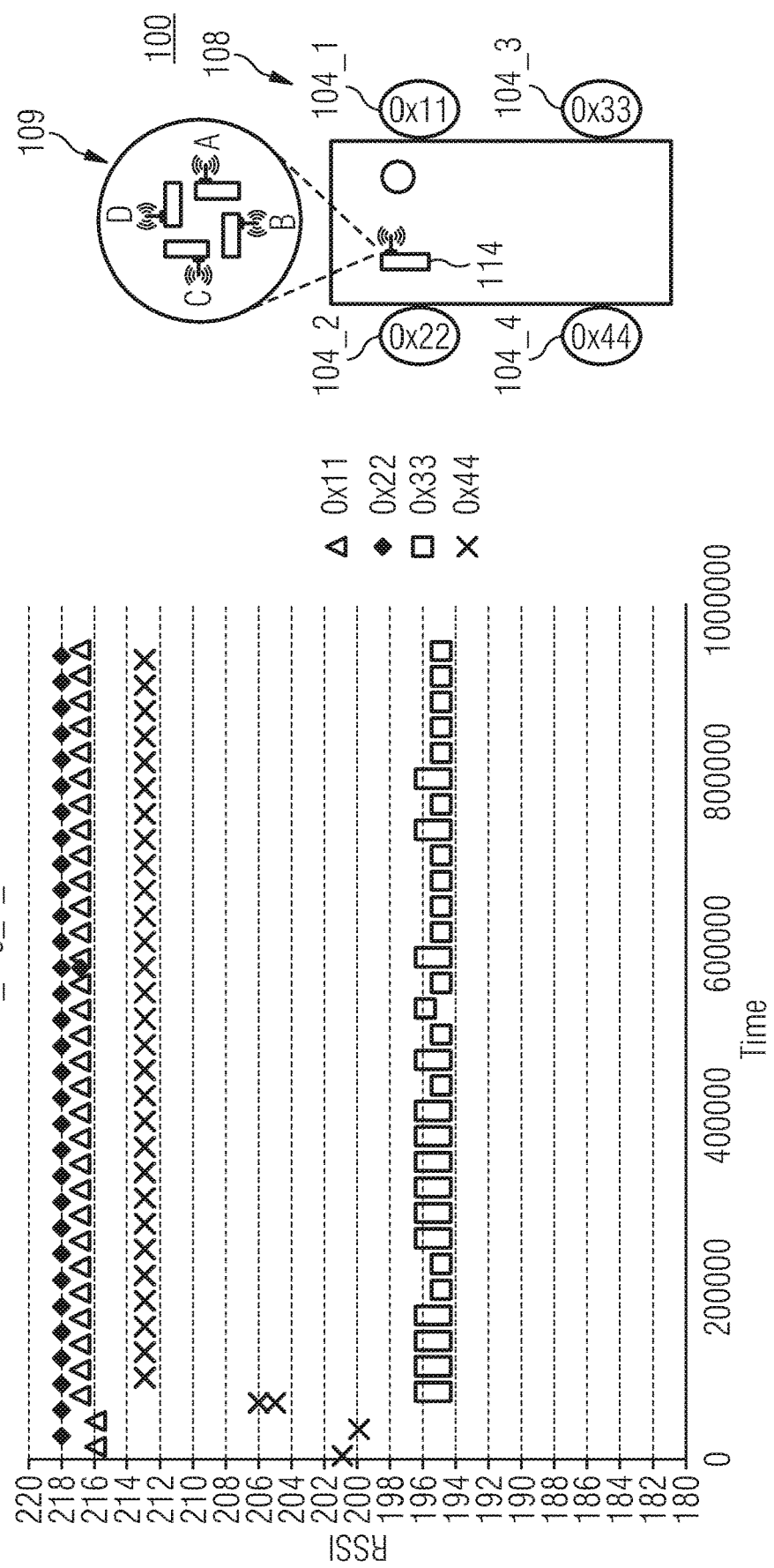

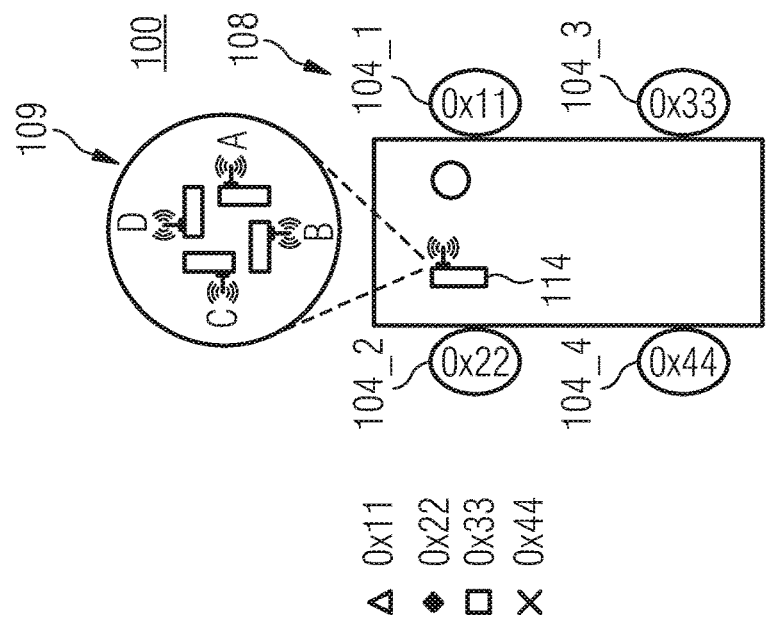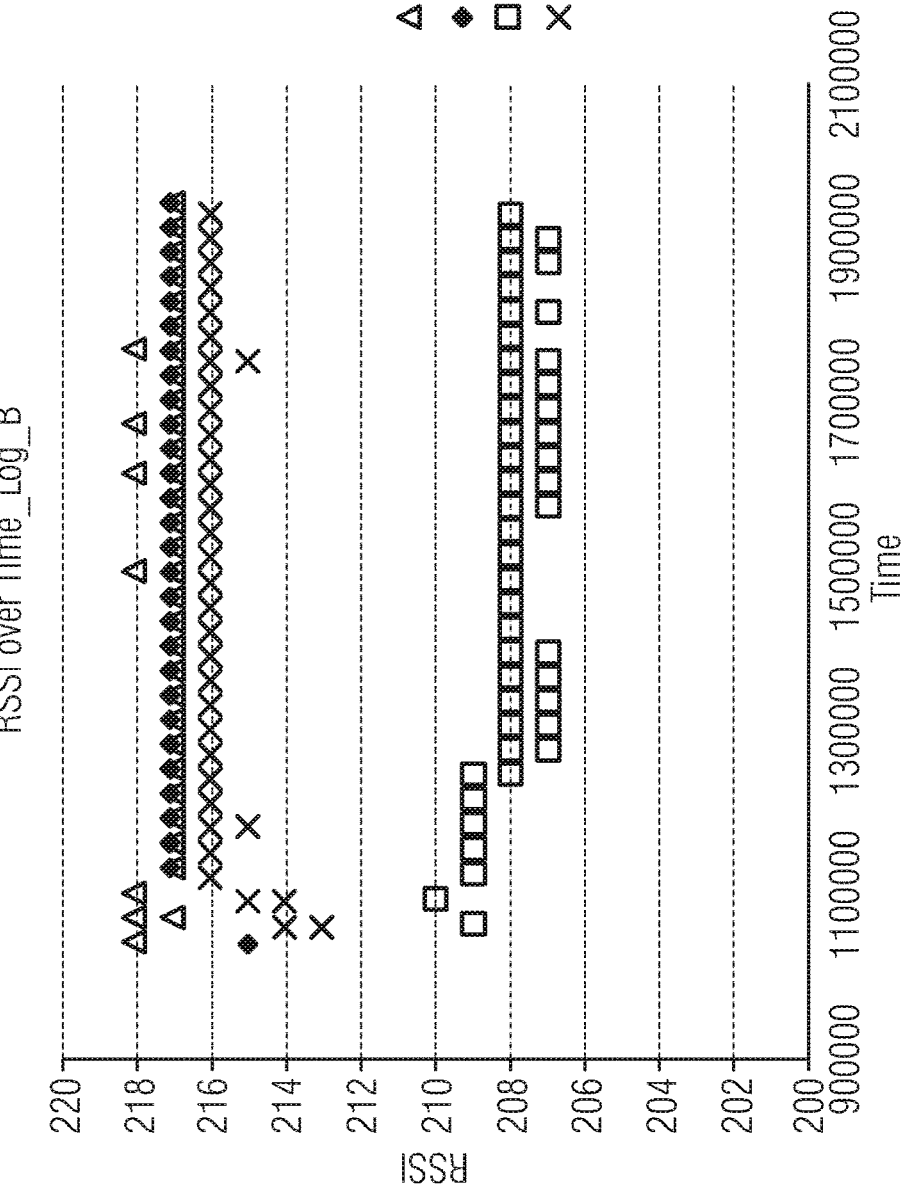
FIG 3B

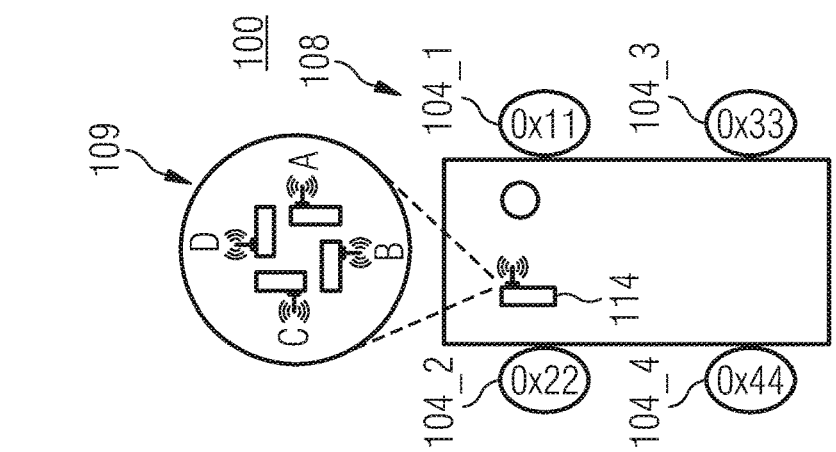
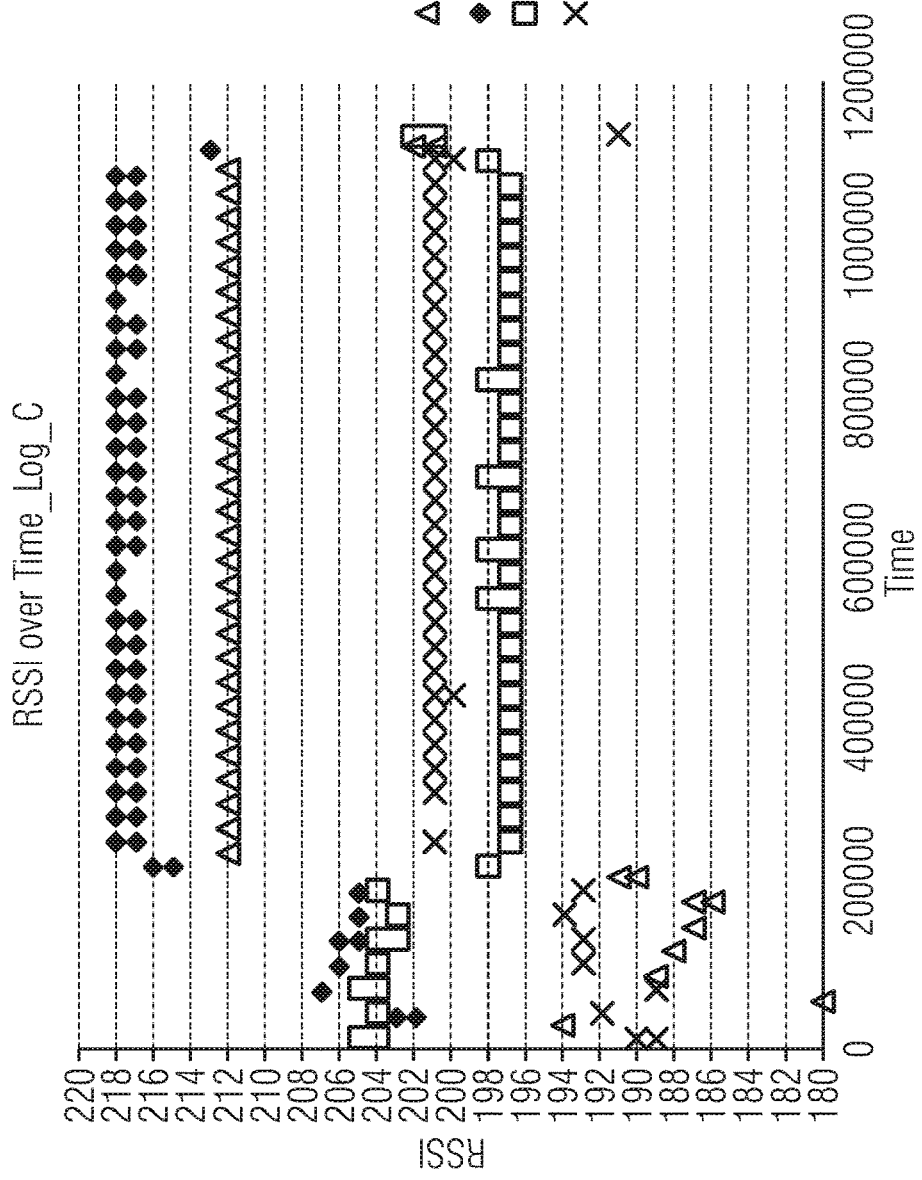
FIG 3C

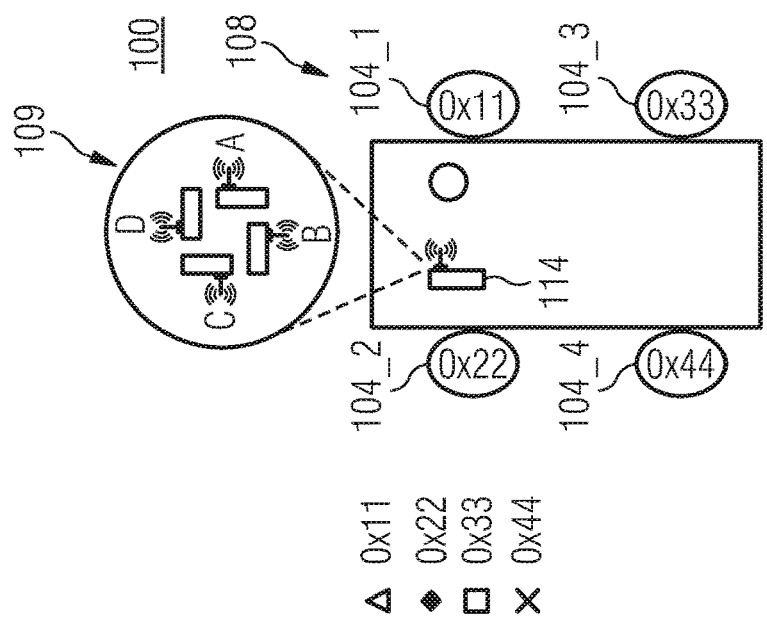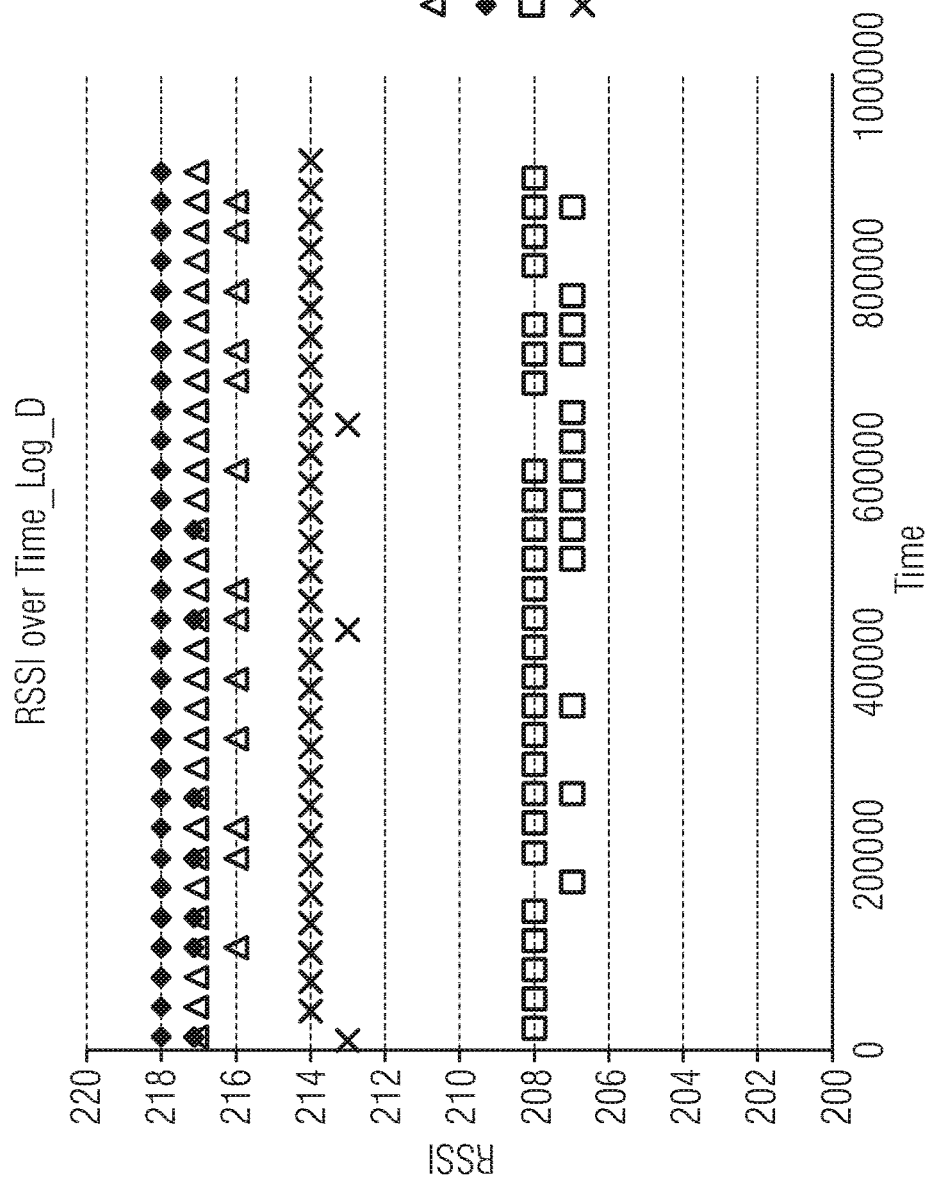
FIG 3D

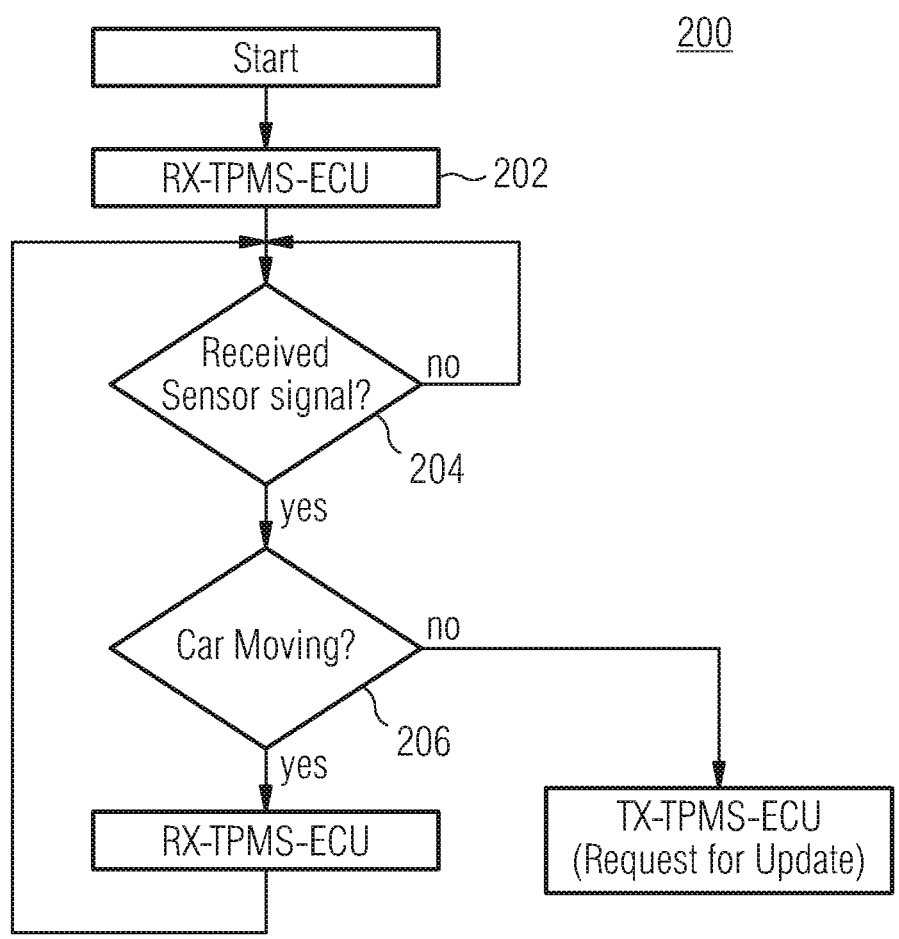

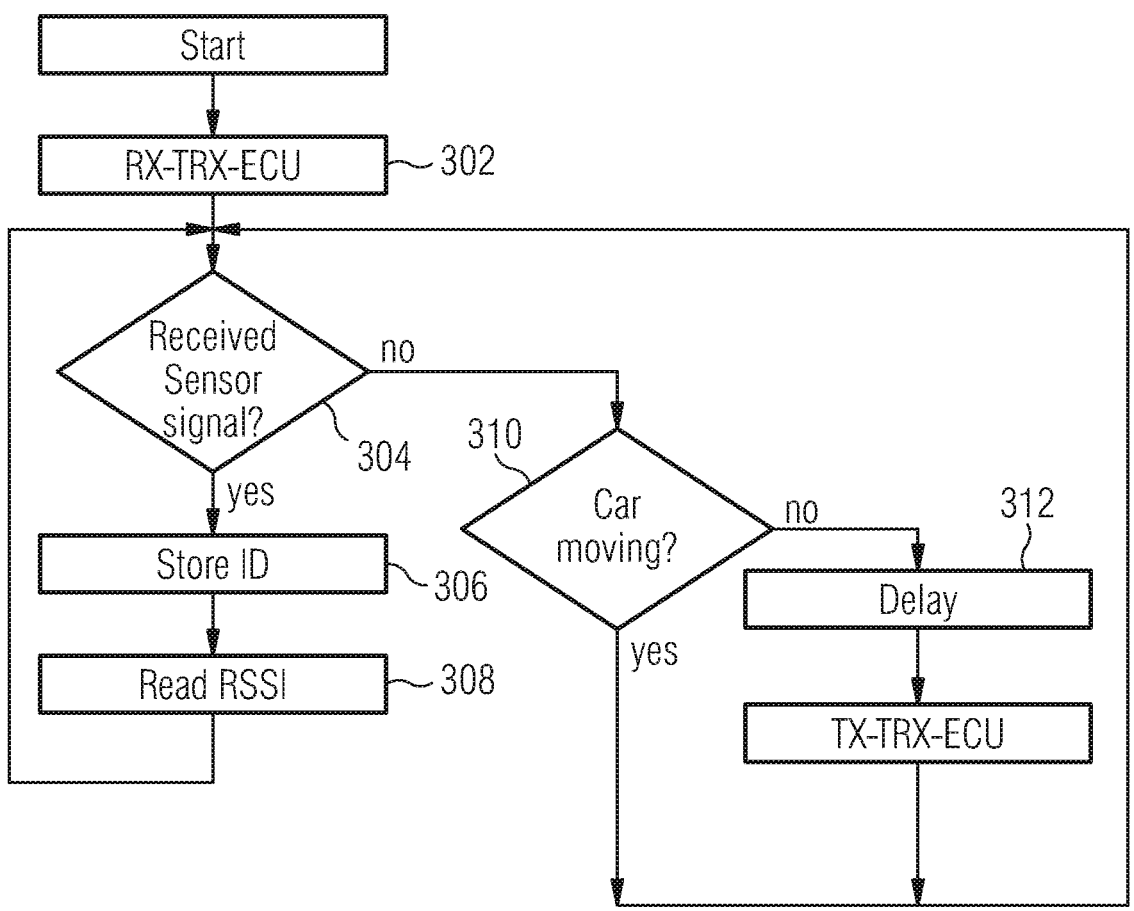

FIG 14

400 transmitting an RF repeater signal with each of the RF repeaters to the central unit, wherein the RF repeater signal comprises an identification of the RF repeater and an identification of the sensor unit the RF repeater is dedicated to — 402 receiving with the central unit the RF repeater signal of each of the RF repeaters and matching the identification of the sensor unit and the identification of the RF repeater with a known identification of the RF repeater — 404

FIG 15

500 transmitting a first sensor signal/data with a first sensor unit attached to a first wheel of the vehicle and transmitting a second sensor signal/data with a second sensor unit attached to a second wheel of the vehicle — 502 retransmitting the first sensor signal/data with a first RF repeater which is dedicated to the first sensor unit and retransmitting the second sensor signal/data with a second RF repeater which is dedicated to the second sensor unit — 504

TIRE PARAMETER MONITORING SYSTEM

FIELD

Embodiments of the present disclosure relate to a tire parameter monitoring system. Further embodiments relate to a method for updating a position of a wheel at a vehicle having a tire parameter monitoring system. Further embodiments relate to a method for monitoring parameters of tires of a vehicle. Some embodiments relate to a TPMS (TPMS=tire pressure monitoring system) tire auto localization with RF (RF=radio frequency) transceivers.

BACKGROUND

TPMS are used for monitoring parameters of tires of a vehicle, such as pressure, temperature and acceleration. When tires are changed or first mounted on a vehicle, the positions of the tires on the vehicle are taught to the TPMS in a teach-in mode, such that in a normal operation mode (e.g., driving mode) in case of a failure, e.g., pressure loss, the TPMS can signal to a driver of the vehicle which of the tires is affected.

Thus, localization in TPMS application is a nice feature. However, it is not commonly implemented because of technical limitation or high cost involved.

Therefore, there is a need for an improved approach.

SUMMARY

Embodiments provide a tire parameter monitoring system comprising at least two RF repeaters, wherein each of the at least two RF repeaters is dedicated to an individual sensor unit of at least two sensor units.

Embodiments provide a tire parameter monitoring system comprising at least two sensor units attached to different wheels of a vehicle, wherein each of the at least two sensor units has a dedicated RF repeater.

Embodiments provide a method for updating a position of a wheel at a vehicle having a tire parameter monitoring system. The tire parameter monitoring system comprises a central unit and at least two sensor units attached to different wheels of the vehicle, wherein each of the at least two sensor units has a dedicated RF repeater. The method comprises transmitting an RF repeater signal with each of the RF repeaters to the central unit, wherein the RF repeater signal comprises an identification of the RF repeater and an identification of the sensor unit the RF repeater is dedicated to. The method further comprises receiving with the central unit the RF repeater signal of each of the RF repeaters and matching the identification of the sensor unit and the identification of the RF repeater with a known identification of the RF repeater.

Embodiments provide a method for monitoring parameters of tires of a vehicle, the method comprises transmitting a first sensor signal/data with a first sensor unit attached to a first wheel of the vehicle and transmitting a second sensor signal/data with a second sensor unit attached to a second wheel of the vehicle. The method further comprises retransmitting the first sensor signal/data with a first RF repeater which is dedicated to the first sensor unit and retransmitting the second sensor signal/data with a second RF repeater which is dedicated to the second sensor unit.

BRIEF DESCRIPTION OF THE DRAWINGS

Embodiments of the present disclosure will subsequently be discussed referring to the enclosed drawings, wherein:

FIG. 1 shows a schematic block diagram of a tire parameter monitoring system;

FIG. 2 shows in a diagram measurements of received signal strength levels (RSSI) in Least significant bit (LSB) plotted over time in ms when the car is moving;

FIG. 3a shows a schematic block diagram of a tire parameter monitoring system, a detailed view of four possible orientations of an antenna of the control unit of the tire parameter monitoring system and in a diagram RSSI in LSB plotted over time in ms for orientation A;

FIG. 3b shows a schematic block diagram of a tire parameter monitoring system, a detailed view of four possible orientations of an antenna of the control unit of the tire parameter monitoring system and in a diagram RSSI in LSB plotted over time in ms for orientation B;

FIG. 3c shows a schematic block diagram of a tire parameter monitoring system, a detailed view of four possible orientations of an antenna of the control unit of the tire parameter monitoring system and in a diagram RSSI in LSB plotted over time in ms for orientation C;

FIG. 3d shows a schematic block diagram of a tire parameter monitoring system, a detailed view of four possible orientations of an antenna of the control unit of the tire parameter monitoring system and in a diagram RSSI in LSB plotted over time in ms for orientation D;

FIG. 8 shows a flowchart of a method for operating the control unit of the tire parameter monitoring system;

FIG. 12 shows a flowchart of a method for operating the RF transceivers (RF repeaters) of the tire parameter monitoring system;

FIG. 14 shows a flowchart of a method for updating a position of a wheel at a vehicle having a tire parameter monitoring system; and FIG. 15 shows a flowchart of a method for monitoring parameters of tires of a vehicle.

DETAILED DESCRIPTION

Figure 4:
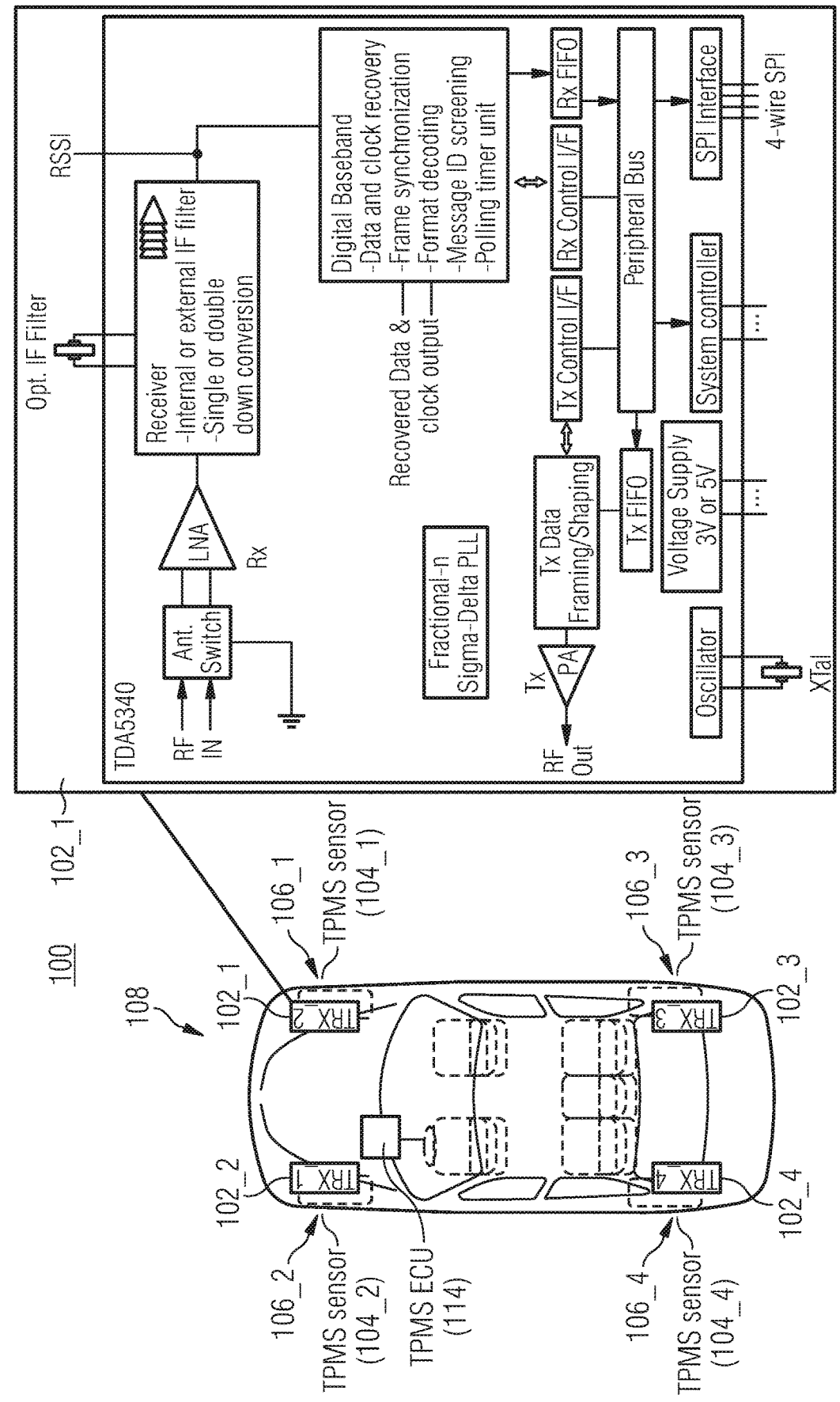
FIG. 4 shows a schematic block diagram of a tire parameter monitoring system implemented in a car and a detailed schematic block diagram of one of the RF repeaters of the tire parameter monitoring system.

Below, embodiments of the present disclosure will subsequently be discussed referring to the enclosed figures, wherein identical reference numerals are provided to objects or elements having the same or similar function so that the description thereof is mutually applicable and interchangeable.

FIG. 1 shows a schematic block diagram of a tire parameter monitoring system 100. The tire parameter monitoring system 100 comprises at least two RF repeaters 102_1, 102_2 (RF=radio frequency), wherein each of the RF repeaters 102_1, 102_2 is dedicated to an individual sensor unit of at least two sensor units 104_1, 104_2.

In detail, a first sensor unit 104_1 of the two sensor units 104_1,104_2 may be attached to a first wheel 106_1 of the vehicle 108, wherein a second sensor unit 104_2 of the two sensor units 104_1,104_2 may be attached to a second wheel 106_2 of the vehicle 108. A first RF repeater 102_1 of the two RF repeaters 102_1, 102_2 can be dedicated to the first sensor unit 104_1, wherein a second RF repeater 102_2 of the two RF repeaters 102_1, 102_2 can be dedicated to the second sensor unit 104_2.

As exemplarily shown in FIG. 1, the vehicle 108 can be, for example, a car having four tires 106_1:106_4. In that case, the tire parameter monitoring system 100 may comprise optionally two additional RF repeaters 102_3,102_4 dedicated to two additional individual sensor units 104_3, 104. In detail, a third sensor unit 102_3 may be attached to a third wheel 106_3 of the vehicle 108, wherein a fourth sensor unit 102_4 may be attached to a fourth wheel 106_4 of the vehicle 108. Thereby, a third RF repeater 102_3 can be dedicated to the third sensor unit 104_3, wherein a fourth RF repeater 102_4 can be dedicated to the fourth sensor unit 104_4.

Naturally, the vehicle 108 can also be a bike having (only) two wheels or a truck having more than four wheels. Subsequently, embodiments of the tire parameter monitoring system 100 are described, in which the tire parameter monitoring system 100 comprises two RF repeaters 102_1, 102_2 dedicated to two individual sensor units 102_1,102,2 (which are attached to two wheels 106_1,106_2 of the vehicle). However, the following description is also applicable to embodiments of the tire parameter monitoring system 100, in which the tire parameter monitoring system 100 comprises more than two RF repeaters dedicated to individual sensor units.

In embodiments, each RF repeater 102_1,102_2 can be configured to receive a sensor signal/data 110_1,110_2 transmitted via RF by the corresponding sensor unit 104_1, 104_2 and retransmit the sensor signal/data in form of an RF repeater signal 112_1,112_2 based on the corresponding sensor signal/data to a central unit 114 of the tire parameter monitoring system 100.

For example, the first RF repeater 102_1 can be configured to receive a first sensor signal/data 110_1 transmitted via RF by the first sensor unit 104_1 and to retransmit the first sensor signal/data 110_1 in form of a first RF repeater signal 112_1 based on the first sensor signal/data 110_1 to a central unit 114 of the tire parameter monitoring system 100. Similarly, the second RF repeater 102_2 can be configured to receive a second sensor signal/data 110_2 transmitted via RF by the second sensor unit 104_2 and to retransmit the second sensor signal/data 110_2 in form of a second RF repeater signal 112_2 based on the second sensor signal/data 110_1 to a central unit 114 of the tire parameter monitoring system 100.

Thereby, each RF repeater 102_1,102_2 can be configured to only retransmit the sensor signal/data of the sensor unit the RF repeater is dedicated to, i.e., the first RF repeater 102_1, which is dedicated to the first sensor unit 104_1, may be configured to only retransmit the first sensor signal/data 110_1 of the first sensor unit 104_1, wherein the second RF repeater 102_2, which is dedicated to the second sensor unit 104_2, may be configured to only retransmit the second sensor signal/data 110_2 of the second sensor unit 104_2.

Further, each RF repeater 102_1,102_2 can be configured to detect the sensor signal of the sensor unit the RF repeater is dedicated to based on a received signal strength. As shown in FIG. 1, a distance between the first RF repeater 102_1 and the first sensor unit 104_1 is smaller than a distance between the first RF repeater 102_1 and the second sensor unit 104_2 leading to that a received signal strength of the first sensor signal/data 110_1 is greater than a received signal strength of the second sensor signal/data 110_2, such that first RF repeater 102_1 may detect the first sensor signal/data 110_1 based on the detected greater signal strength of the first sensor signal/data 110_1. Similarly, a distance between the second RF repeater 102_1 and the second sensor unit 104_2 is smaller than a distance between the second RF repeater 102_2 and the first sensor unit 104_1 leading to that a received signal strength of the second sensor signal/data 110_2 is greater than a received signal strength of the first sensor signal/data 110_1, such that the second RF repeater 102_2 may detect the second sensor signal/data 110_2 based on the detected greater signal strength of the second sensor signal/data 110_2.

The sensor signal/data 110_1,110_2 may comprise an information describing a parameter of the wheel 106_1, 106_2 the sensor unit is attached to. For example, the parameter of the wheel can be at least one out of pressure, temperature, acceleration, battery voltage and sensor unit identification of a tire of the wheel.

Further, the RF repeater signal may comprise the information describing the parameter of the wheel the corresponding sensor unit is attached to and an identification of the RF repeater. The central unit can be configured to receive the RF repeater signal and to allocate the information describing the parameter of the wheel to a position of the wheel at the vehicle using the identification of the RF repeater. The sensor signal/data may further comprise an identification of the sensor unit, wherein the central unit is configured to allocate the information describing the parameter of the wheel to a position of the wheel at the vehicle by matching the identification of the sensor unit and the identification of the RF repeater with a known identification of the RF repeater. Thereby, a position of the RF repeater may be known to the central unit.

In the following, embodiments of the tire parameter monitoring system 100 are described, in which the tire parameter monitoring system 100 comprises four RF repeaters 102_1:102_4 dedicated to four individual sensor units 104_1:104_4 attached to four different wheels 106_1:106_6 of a vehicle (e.g., a car).

For TPMS (TPMS=tire pressure monitoring system), the proposed concept provides a solution to localize the TPMS tire modules 104_1:104_4 according to the vehicle wheel positions, e.g., front right, front left, rear right and rear left.

So that a driver of the vehicle is updated with tire information (e.g., pressure, temperature) with its corresponding position.

The proposed concept uses four known RF transceivers 102_1:102_4 as repeaters. Each transceiver receives tire information (e.g., pressure, temperature, sensor ID (ID=identity of identification) from the nearest TPMS sensor (or sensor unit) 104_1:104_4 and transmits tire information and RF transceiver identity (TRX_ID) to TPMS ECU (ECU=electronic control unit) 114. Each RF transceiver 102_1:102_4 is fixed near to each tire 106_1:106_4 in the car 108 and its position is known to TPMS ECU 114. When the car 108 is moving, TPMS sensors 104_1:104_4 transmit tire information regularly to both TPMS ECU 114 and RF transceivers 102_1:102_4. Based on its received signal strength (RSS) or received signal strength level (RSSI), each RF transceiver 102_1:102_4 is able to recognize the sensor signal 110_1:110_4 from the nearest TPMS sensor 104_1:104_4. RF transceivers 102_1:102_4 re-transmit the received sensor signal 110_1:110_4 to TPMS ECU 114 when they receive a request from TPMS ECU 114. TPMS ECU 114 is able to display each tire information with its corresponding position based on the known positions of RF transceivers 102_1:102_4.

FIG. 2 shows in a diagram (graph) measurements of received signal strength indication (RSSI) level in LSB plotted over time in ms. The measurement is done using a TPMS sensor attached to a wheel and an RF Receiver (as RF transceiver or repeater) placed in the car near to the TPMS sensor. When the car is driven around, the TPMS sensor transmits tire information (e.g., centrifugal acceleration) to the RF receiver which records the received signal strength of the payload or telegram from the TPMS sensor over a period.

As shown in FIG. 2, RF receiver receives both wanted signal as well as noise. The RSSI of the wanted signal is high above noise and so RF receiver or RF transceiver is able to recognize the wanted TPMS sensor signal from noise. Generally, measured RSSI level is reversely proportional to the square of the distance between the TPMS sensor and the RF receiver or RF transceiver. Hence, RF receiver 102_1 measures highest RSSI level from TPMS sensor 104_1 (e.g., at front right) nearest to it as compared to TPMS sensor 104_2,104_3 located at opposite wheel (e.g., at rear right or front left). As the result, each RF transceiver or RF receiver is able to recognize nearest TPMS sensor and stores its sensor ID and other tire information.

In other words, FIG. 2 shows RSSI level characteristics (with a rotating wheel) of the TPMS auto localization system 100. To verify RSSI level characteristics when car is moving, TPMS sensor can be placed in the car tire and RF receiver in the car cabin near to the wheel. The car can be driven on the road. The TPMS sensor can be configured to transmit every 30 s. Whenever RF receiver receives TPMS sensor signal, it records level of its received signal strength (RSSI). As shown in FIG. 2, RSSI level is quite flat. Further, RSSI level of wanted signal is higher than noise. Based on the strongest RSSI level of TPMS sensors, each RF transceiver is able to determine its nearest TPMS sensor.

For localization, TPMS ECU 114 sends request to RF transceivers. Upon receiving request from TPMS ECU 114, RF transceivers transmit sensor ID, its own identity (TRX ID) and other tire information. TPMS ECU 114 proceeds to match received sensor ID and each RF transceiver ID with known RF transceiver ID. Next time, TPMS sensors transmit tire information, TPMS ECU is able to update tire information of each wheel with its position.

Each RF transceiver can be an independent module with its own 3.3V or 5V supply (e.g., from dried battery). This is because each RF transceiver consumes less power as compared to that of LF repeater. High reliability of wireless transmission is possible because each RF transceiver is fixed at car body near to each wheel. The driver could send request for tire information update. Pressure on demand can be implemented. Cost of each RF transceiver module is lower than LF repeater.

In the following, an implementation example of the proposed concept for solving localization in TPMS application is described.

The proposed concept is implemented using four TPMS sensors 104_1:104_4 (e.g., SP37 from Infineon), four RF transceivers 102_1:102_4 (e.g., TDA5340 from Infineon) as repeaters and one TPMS ECU 114 (e.g., TDA5340 from Infineon). TPMS sensor 104_1:104_4 located in the wheel 106_1:106_4 may acquire tire information which contains sensor identity (ID), pressure, centrifugal acceleration, temperature. RF transceiver 102_1:102_4 may be located near to the wheel or tire 106_1:106_4 and its position (e.g., front right, front left, left right or left left) is known to TPMS ECU 114. Each RF transceiver 102_1:102_4 can be identified by its own ID and its position may be known on the vehicle 108.

In the car 108, TPMS sensors 104_1:104_4 may operate in different modes for preserving its power consumption. When car 108 moves at low speed, TPMS sensors 104_1:104_4 may transmit regularly at short interval (e.g., 1 min). As the car 108 reaches high speed (e.g., 80 km/h), TPMS sensors 104_1:104_4 may transmit at shorter interval. TPMS ECU 114 and RF repeaters 102_1:102_4 receive tire information and TPMS sensor ID from TPMS sensors 104_1:104_4. Because each RF repeater 102_1:102_4 has updated sensor ID of its corresponding TPMS sensor 104_1:104_4 to TPMS ECU 114, TPMS ECU 114 is able to determine each tire information.

When car 108 is stationary over a period or is parked, TPMS sensors 104_1:104_4 may transmit regularly at long interval (e.g., 3-5 mins). TPMS ECU 114 may initiate tire information update or localization during this period by sending request signal to RF transceivers 102_1:102_4. In response, each RF transceiver 102_1:102_4 can send TPMS sensor ID, RF transceiver ID and tire information.

After sending request signal, TPMS ECU 114 can listen to or expect response from all RF transceivers 102_1:102_4. If period elapses and TPMS ECU 114 has not received response from RF transceivers 102_1:102_4, TPMS ECU 114 may send request signal second time. TPMS ECU 114 can be configured to receive or listen to response from all RF transceivers 102_1:102_4. If TPMS ECU 114 successfully receives signal from all RF transceivers 102_1:102_4, it may proceed to match received sensor ID and each RF transceiver ID with known RF transceiver ID. TPMS ECU 114 can be configured to listen to TPMS sensor signal. Next localization occurs when car 108 comes to stop again or is stationary.

When RF transceiver 102_1:102_4 operates in receive mode, it listens to signal from TPMS sensors 104_1:104_4 and TPMS ECU 114 which are similar e.g., TSI (Telegram Starting Indicator) and data length. When car 108 moves, each RF transceiver 102_1:102_4 receives sensor signal and recognizes sensor signal from its nearest TPMS sensor 104_1:104_4 based on RSSI level. It stores or records sensor ID and tire information. When car 108 is stationary or parked, RF transceivers 102_1:102_4 listen to signal from TPMS sensors 104_1:104_4 and TPMS ECU 114. If it receives signal from TPMS ECU 114, RF transceiver 102_1:102_4 transmits TPMS sensor ID for localization purpose.

In another implementation, TPMS ECU 114 uses RF receiver (e.g., TDA5240 from Infineon) instead of RF transceiver. When car 108 moves, TPMS ECU 114 and RF transceiver 102_1:102_4 receive signal from TPMS sensors 104_1:104_4. Since each RF transceiver 102_1:102_4 has updated sensor ID of its corresponding TPMS sensor 104_1:104_4 to TPMS ECU 114, TPMS ECU 114 is able to update and display each tire information with its corresponding position.

When car 108 is stationary over a period (e.g., 3 min) or is parked, TPMS sensors 104_1:104_4 transmit regularly at long interval. TPMS ECU 114 is then configured to listen to signal from RF transceivers 102_1:102_4. If TPMS ECU 114 receives signal successfully, it matches received sensor ID and each RF transceiver ID with known RF transceiver ID. After completing localization, TPMS ECU 114 is configured to listen to TPMS sensors 104_1:104_4.

After a period (e.g., 1 min) elapses and TPMS ECU 114 has not successfully received signal from all RF transceivers 102_1:102_4. TPMS ECU 114 also can be configured to listen to TPMS sensors 104_1:104_4. TPMS ECU 114 would listen to signal from RF repeaters 102_1:102_4 next time when car 108 comes to stop or is parked again.

When car 108 is moving, each RF transceiver 102_1:102_4 may receive sensor signal from its nearest TPMS sensor 104_1:104_4 based on RSSI level. When car 108 is stationary over a period, each RF transceiver transmits sensor ID to TPMS ECU 114 for localization purpose.

FIG. 3a shows a schematic block diagram of a TPMS 100, a detailed view 109 of four possible orientations of an antenna of the ECU 114 of the TPMS 100 and in a diagram a RSSI in LSB plotted over time in ms for orientation A. In other words, FIG. 3a shows RSSI measurement from 4 TRX-ECU and antenna in A orientation.

FIG. 3b shows a schematic block diagram of a TPMS 100, a detailed view 109 of four possible orientations of an antenna of the ECU 114 of the TPMS 100 and in a diagram a RSSI in LSB plotted over time in ms for orientation B. In other words, FIG. 3b shows RSSI measurement from 4 TRX-ECU and antenna in B orientation.

FIG. 3c shows a schematic block diagram of a TPMS 100, a detailed view 109 of four possible orientations of an antenna of the ECU 114 of the TPMS 100 and in a diagram a RSSI in LSB plotted over time in ms for orientation C. In other words, FIG. 3c shows RSSI measurement from 4 TRX-ECU and antenna in C orientation.

FIG. 3d shows a schematic block diagram of a TPMS 100, a detailed view 109 of four possible orientations of an antenna of the ECU 114 of the TPMS 100 and in a diagram a RSSI in LSB plotted over time in ms for orientation D. In other words, FIG. 3d shows RSSI measurement from 4 TRX-ECU and antenna in D orientation.

As shown in FIGS. 3a-3d, measurement shows four RSSI levels for four TPMS sensors (as RF transceivers). Difference of RSSI levels between rear and front wheels is measurable. Difference of RSSI levels between both rear wheels is larger than that of front wheels. Similar measurements are done for different orientation of TPMS ECU antenna or after rotating TPMS ECU antenna 90 degree.

In other words, FIGS. 3a-3d show characteristics of four RSSI levels of the TPMS auto localization system 100. Four RF transceivers (as repeater) can be configured to transmit every 30 s to RF receiver (as TPMS ECU). The RSSI can be recorded on TPMS ECU 114. RF Transceivers IDs are as follows 0x11, 0x22, 0x33 and 0x44 and are located next to each tire. TPMS ECU can be placed nearest to the RF Transceiver (0x11) in the front passenger seat. As shown in FIGS. 3a-3d, the recorded RSSI are stable and consistent for each RF transceiver. RSSI is reversely proportional to distance between RF transceiver and TPMS ECU 114.

FIG. 4 shows a schematic block diagram of a TPMS 100 implemented in a car 108 and a detailed schematic block diagram 111 of one of the RF repeaters 104_1 of the TPMS 100. In other words, FIG. 4 shows a TPMS 100 tire auto localization system with RF transceivers 102_1:102_4. RF transceivers 102_1:102_4 are used as TPMS RF repeaters. Position of each TPMS RF repeater (e.g., front right, rear left etc.) is known to TPMS ECU 114 as it is installed at a position very close to the corresponding wheel 106_1:106_4. When car 108 is moving, TPMS tire modules 104_1:104_4 are sending sensor signal to TPMS ECU 114 and RF transceivers (TPMS RF repeater) 102_1:102_4. RF transceivers (TPMS RF repeater) 102_1:102_4 then send received TPMS tire module information to TPMS ECU 114 upon request from TPMS ECU 114. TPMS ECU 114 then proceeds with localization based on the known positions of TPMS RF repeaters 102_1:102_4. It matches received sensor ID and each RF transceiver ID with known RF transceiver ID (RF Transceiver location).

Figure 5A:
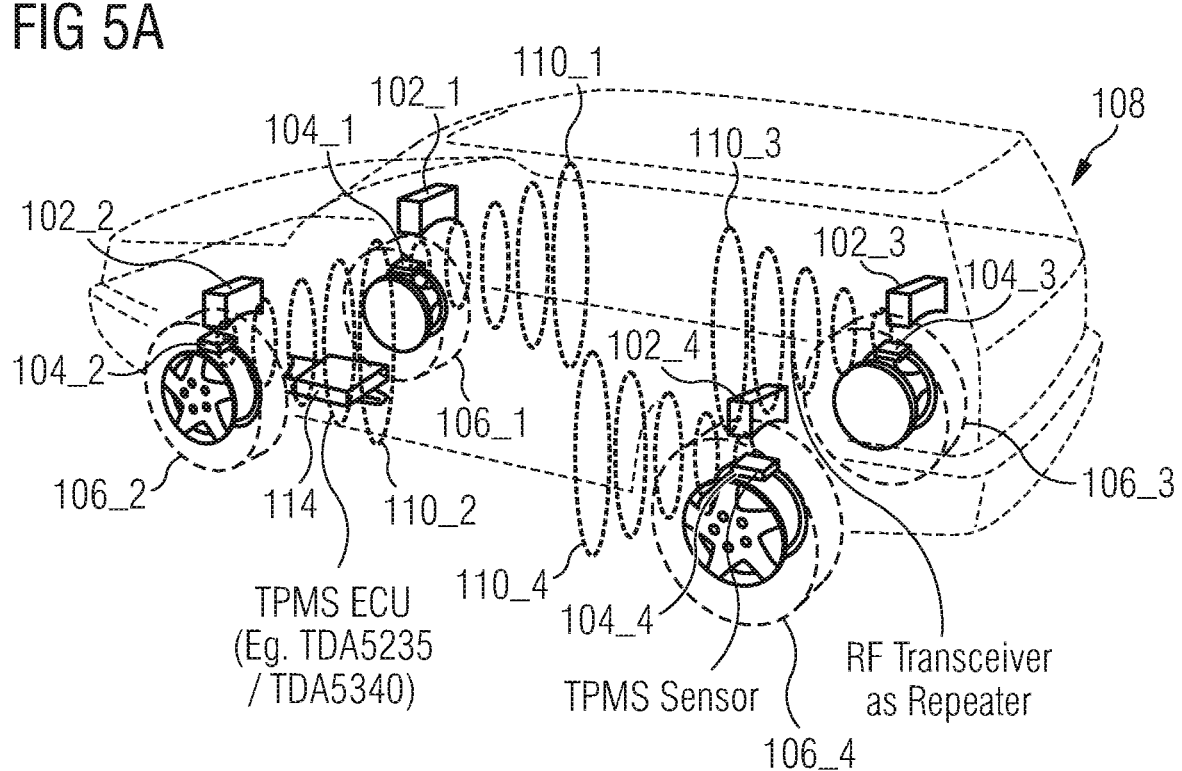
FIG. 5a shows a schematic block diagram of a tire parameter monitoring system implemented in a car and schematic views of signals transmitted when the car is moving.

FIG. 5a shows a schematic block diagram of a TPMS 100 implemented in a car 108 and schematic views of signals transmitted when the car 108 is moving. In other words, FIG. 5a shows a TPMS auto localization system and TPMS operation when car is moving. When car moves, TPMS tire modules 104_1:104_4 send sensor signal (e.g., 10 s) to TPMS ECU 114 and RF transceivers (c) 102_1:102_4. TPMS ECU 114 receives four TPMS tire module signals 110_1:110_4 and displays them on dash board. Each RF transceiver 102_1:102_4 receives strongest TPMS tire module signal based on RSSI level and records its sensor ID. RF Transceiver transmits sensor ID when it receives localization request from TPMS ECU.

Figure 5B:
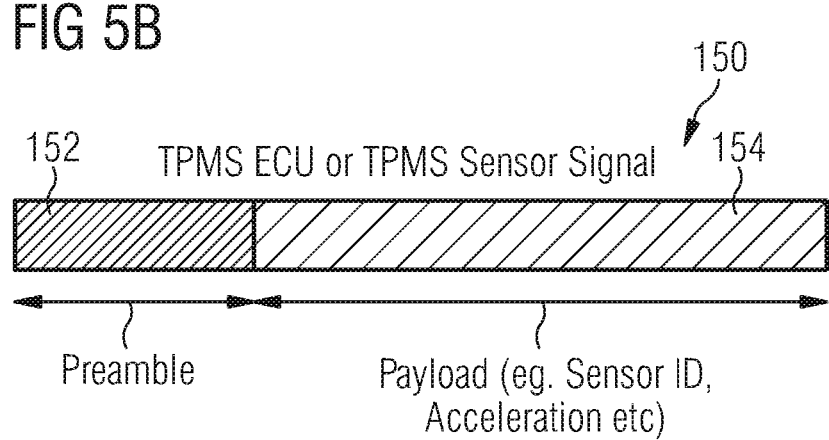
FIG. 5b shows a schematic view of a signal transmitted by a control unit or sensor unit of the tire parameter monitoring system in form of a data packet 150.

FIG. 5b shows a schematic view of a TPMS ECU or TPMS sensor signal in form of a data packet 150. As shown in FIG. 5b, the data packet 150 may comprise a preamble 152 and payload (e.g., sensor ID, acceleration value, etc.).

Figure 6A:
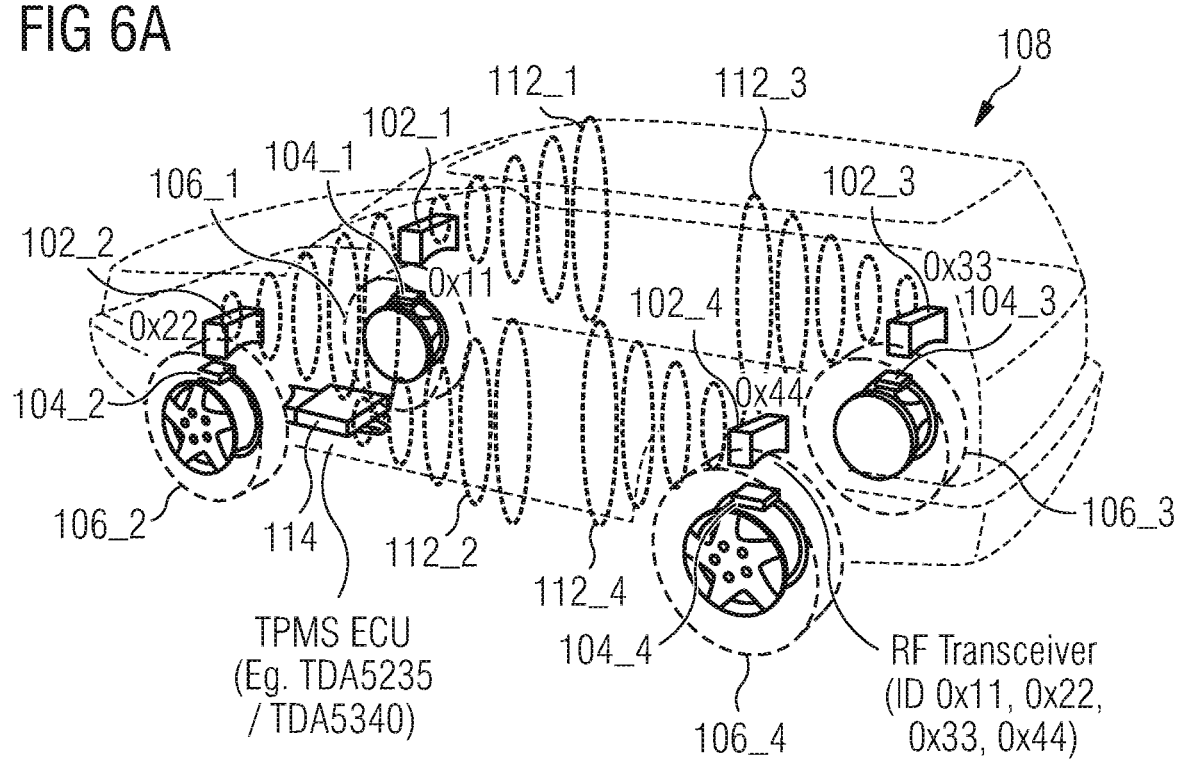
FIG. 6a shows a schematic block diagram of a tire parameter monitoring system implemented in a car and schematic views of signals transmitted when the car is stationary.

FIG. 6a shows a schematic block diagram of a TPMS 100 implemented in a car 108 and schematic views of signals transmitted when the car 108 is stationary. In other words, FIG. 6a shows TPMS auto localization system and TPMS operation when car 108 is stationary (localization operation). When car 108 stops, TPMS tire modules 104_1:104_4 send or transmit less frequent (e.g., 5 min) to TPMS ECU 114 for longer battery life, providing an RF communication window between TPMS ECU 114 and the RF transceivers 102_1:104:_4. TPMS ECU 114 sends request to TPMS RF repeaters 102_1:102_4 for localization purpose. Each TPMS RF transceiver 102_1:102_4 in response, sends its received TPMS sensor ID and RF Transceiver ID to TPMS ECU 114. Upon receiving feedback signal from RF transceivers 102_1:102_4, TPMS ECU 114 matches received sensor ID and each RF transceiver ID with known RF transceiver ID (RF transceiver location).

Figure 6B:
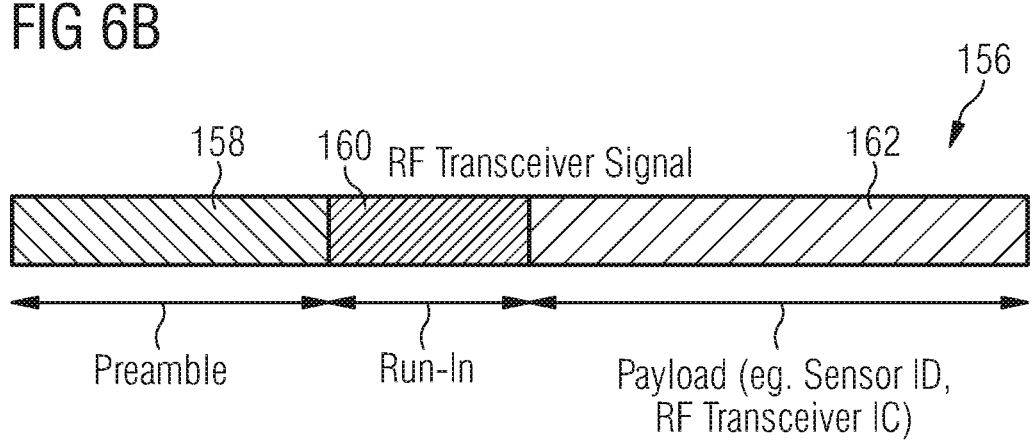
FIG. 6b shows a schematic view of a RF transceiver signal transmitted by an RF repeater of the tire parameter monitoring system in form of a data packet.

FIG. 6b shows a schematic view of a RF transceiver signal in form of a data packet 156. As shown in FIG. 6b, the data packet 156 can comprise a preamble 158, followed by a run-in portion 160 and payload (e.g., sensor ID, RF transceiver ID, etc.).

Figure 7A:
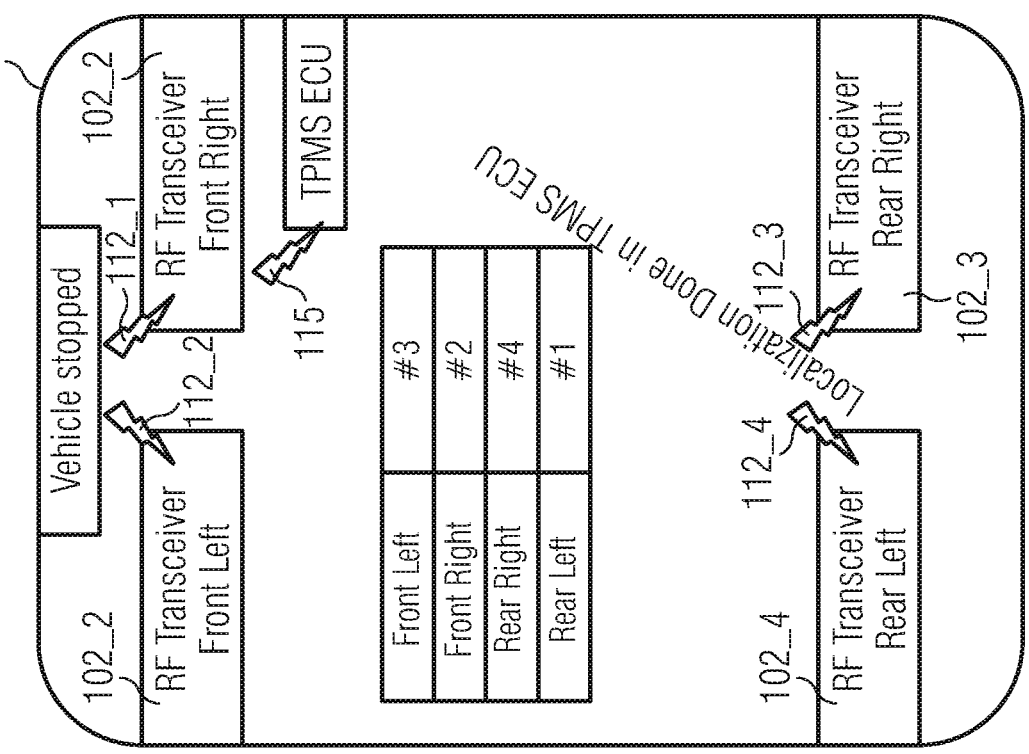
FIG. 7a shows a schematic block diagram of a tire parameter monitoring system implemented in a vehicle and a schematic view of the operation of the tire parameter monitoring system when the vehicle is moving.

FIG. 7a shows a schematic block diagram of a TPMS 100 implemented in a vehicle 108 and a schematic view of the operation of the TPMS 100 when the vehicle 100 is moving. When the vehicle 108 is moving, each of the TPMS tire modules (sensor units) 104_1:104_4 transmits a signal 110_1:110_4 comprising its sensor ID (e.g., #1, #2, #3 or #4). Note that in FIG. 7*a*, the first TPMS tire module 104_1 comprises the sensor ID #2, the second TPMS tire module 104_2 comprises the sensor ID #3, the third TPMS tire module 104_3 comprises the sensor ID #4 and the fourth TPMS tire module 104_4 comprises the sensor ID #1.

Each of the RF transceivers 102_1:102_4 detects the sensor signal 110_1:110_4 of the TPMS tire module 104_1: 104_4 the RF transceiver 102_1:102_4 is dedicated to based on RSSI. In FIG. 7*a*, the first RF transceiver 102_1 located front right at the vehicle 108 will measure a highest RSSI from the first TPMS tire module 104_1 having the sensor ID #1, wherein the second RF transceiver 102_2 located front left at the vehicle 108 will measure a highest RSSI from the second TPMS tire module 104_2 having the sensor ID #3, wherein the third RF transceiver 102_3 located rear right at the vehicle 108 will measure a highest RSSI from the third TPMS tire module 104_3 having the sensor ID #4, and wherein the fourth RF transceiver 102_4 located rear left at the vehicle 108 will measure a highest RSSI from the fourth TPMS tire module 104_4 having the sensor ID #1.

Figure 7B:
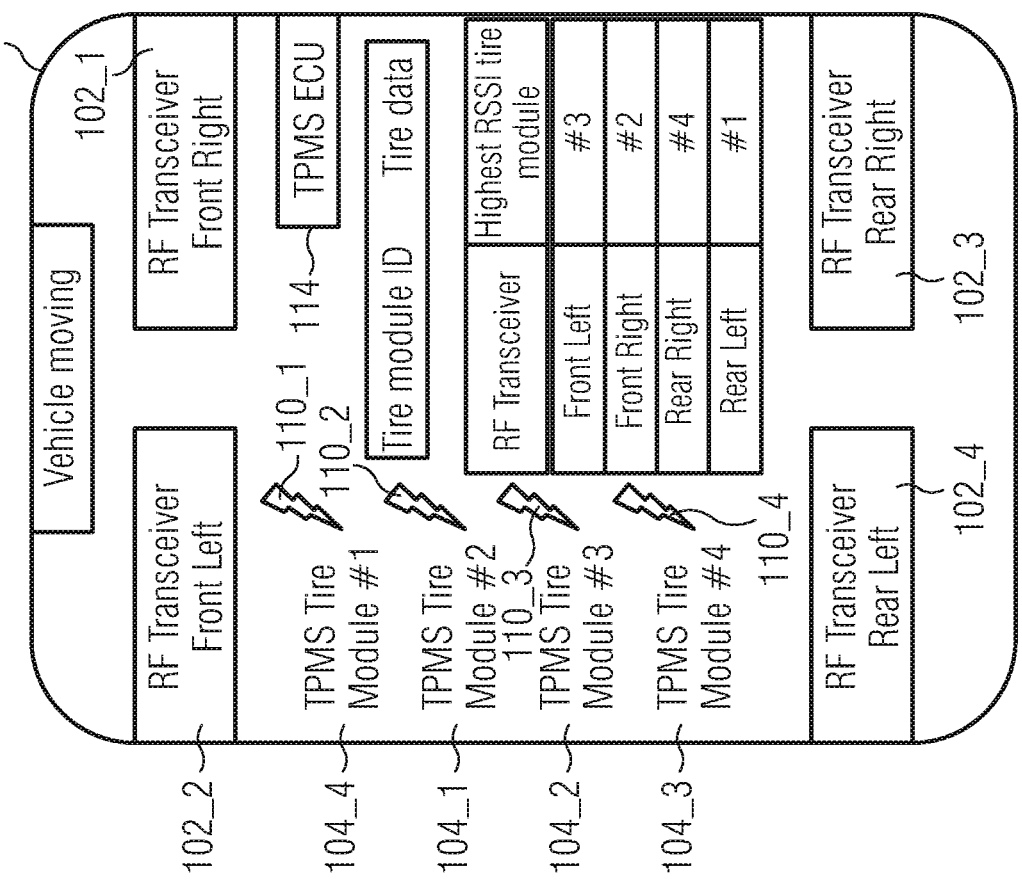
FIG. 7b shows a schematic block diagram of a tire parameter monitoring system implemented in a vehicle and a schematic view of the operation of the tire parameter monitoring system when the vehicle is stationary.

FIG. 7*b* shows a schematic block diagram of a TPMS 100 implemented in a vehicle 108 and a schematic view of the operation of the TPMS 100 when the vehicle 100 is stopped or stationary. When the vehicle 108 is stationary, TPMS ECU 114 sends a request to RF transceivers 102_1:102_4 for localization purpose. Each RF transceiver 102_1:102_4 in response, sends its received TPMS sensor ID and RF Transceiver ID to TPMS ECU 114. Upon receiving feedback signal 112_1:112_4 from RF transceivers 102_1:102_4, TPMS ECU 114 matches received sensor ID and each RF transceiver ID with known RF transceiver ID (RF transceiver location).

FIG. 8 shows a flowchart of a method 200 for operating the ECU 114 of the TPMS 100. In a first step 202 the TPMS ECU 114 is switched to a receive mode, i.e., a mode in which the TPMS ECU 114 is configured to receive signals transmitted by the TPMS tire modules 104_1:104_4 or RF transceivers 102_1:102_4. In a second step 204, the TPMS ECU 114 determines or detects whether a sensor signal is received. If a sensor signal is received, the TPMS ECU 114 proceeds to a third step 206, else the second step is repeated. In the third step 206 the TPMS ECU 114 determines or detects whether the vehicle 108 is moving. If the vehicle is moving, the TPMS ECU 114 maintains in the receive mode and the second step 204 is repeated, else the TPMS ECU 114 is switched to the transmit mode and transmits an update request.

In other words, FIG. 8 shows a TPMS ECU flowchart for TPMS auto localization (TPMS ECU SW for RF transceiver). TPMS ECU can be configured as receive or transmit mode. TPMS ECU is configured as receiver mostly for receiving TPMS sensor signal. Upon receiving TPMS sensor signal, TPMS ECU checks if car is moving. When car is moving, TPMS ECU displays received sensor signal for driver. When car is stationary, TPMS ECU sends request to RF transceivers for localization.

Figure 9:
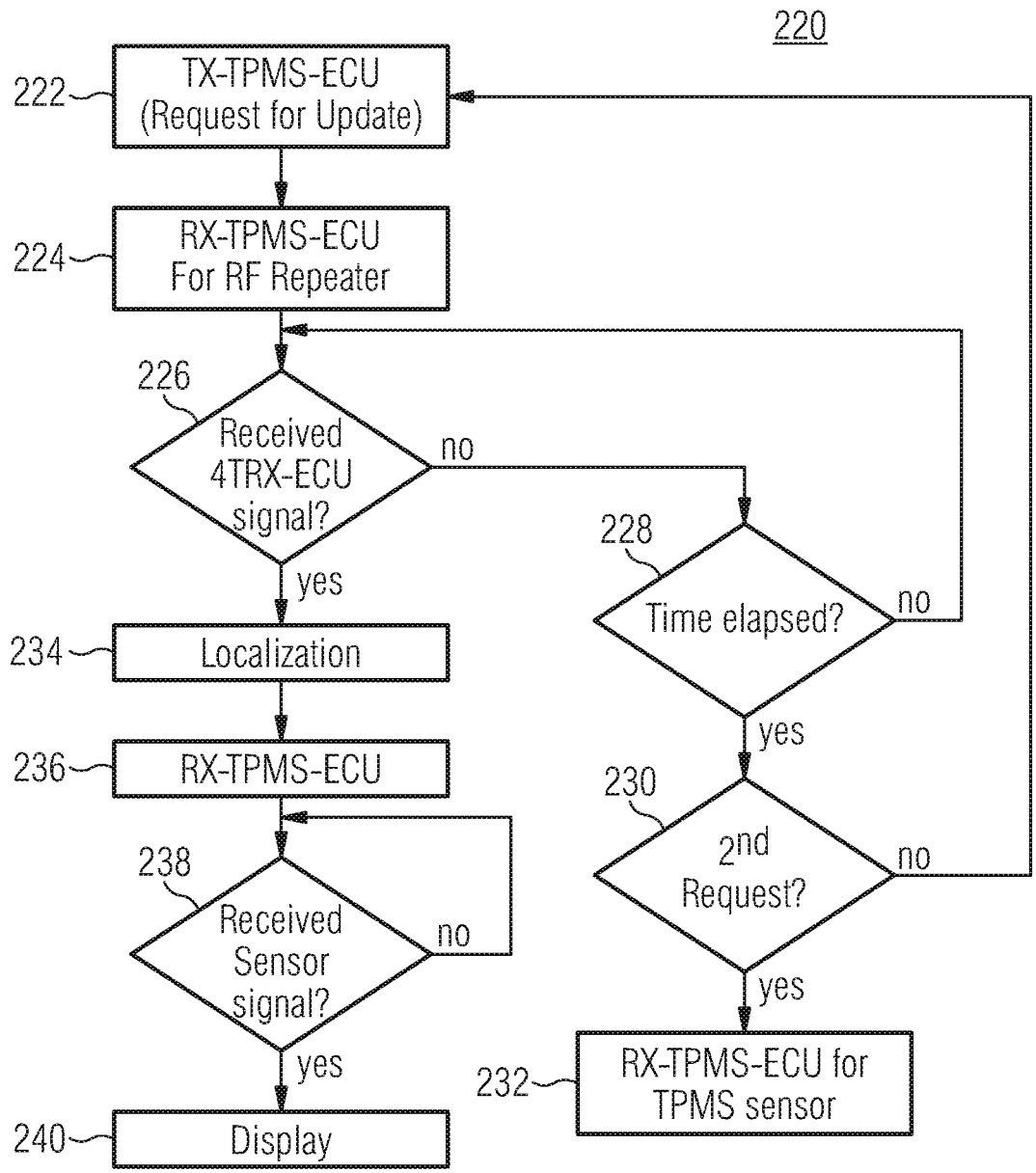
FIG. 9 shows a flowchart of a method for operating the control unit of the tire parameter monitoring system.

FIG. 9 shows a flowchart of a method 220 for operating the ECU 114 of the TPMS 100. In a first step 222 the TPMS ECU 114 is switched to a receive mode (e.g., using the method 200 shown in FIG. 8) and transmits a request to RF transceivers 102_1:102_4 for localization. In a second step 224 TPMS ECU 114 is switched to receive mode. In a third step 226, TPMS ECU 114 determines whether four RF transceiver signals 112_1:112_4 were received, i.e., if RF transceiver signals were received from all four RF transceivers 102_1:102_4.

If the four RF transceiver signals 112_1:112_4 were not received, then it is proceeded to a fourth step 228 in which it is determined if a predefined time is elapsed. If the predetermined time is not elapsed, then it is proceeded with the third step 226, else it is proceeded with a fifth step 230 in which it is determined whether this was already the second request for localization transmitted to RF transceivers 102_1:102_4. If not, then it is proceeded with the first step 222, else it is proceeded with a sixth step 232 in which the TPMS ECU 114 is maintained in the receive mode but tries to detect the signals transmitted by the TPMS tire modules 104_1:104_4 directly.

If the four RF transceiver signals 112_1:112_4 were received it is proceeded to a seventh step 234 in which localization is performed and afterwards to an eight step 236 in which the TPMS ECU 114 is maintained in the receive mode.

In a ninth step it is determined whether sensor signals were received. If not, then the ninth step 238 is repeated, else it is proceeded to a tenth step 240 in which values contained in the sensor signals are displayed.

In other words, FIG. 9 shows TPMS ECU flowchart for TPMS auto localization (TPMS ECU SW for RF transceiver). When car 108 is stationary, TPMS ECU 114 send request for localization. After sending request, TPMS ECU 114 is configured as receiver. If TPMS ECU 114 receives all RF transceiver signals 112_1:112_4 successfully, TPMS ECU 114 proceeds to do localization. TPMS ECU 114 is configured to listen to TPMS sensor signal. Next localization occurs when car speed falls below its threshold or is stationary over a period again. If period elapses and TPMS ECU 114 has not received response from four RF transceivers 102_1:102_4, TPMS ECU 114 sends request second time. TPMS ECU 114 is configured to receive or listen to TPMS sensor signal 110_1:110_4 after second request.

Figure 10:
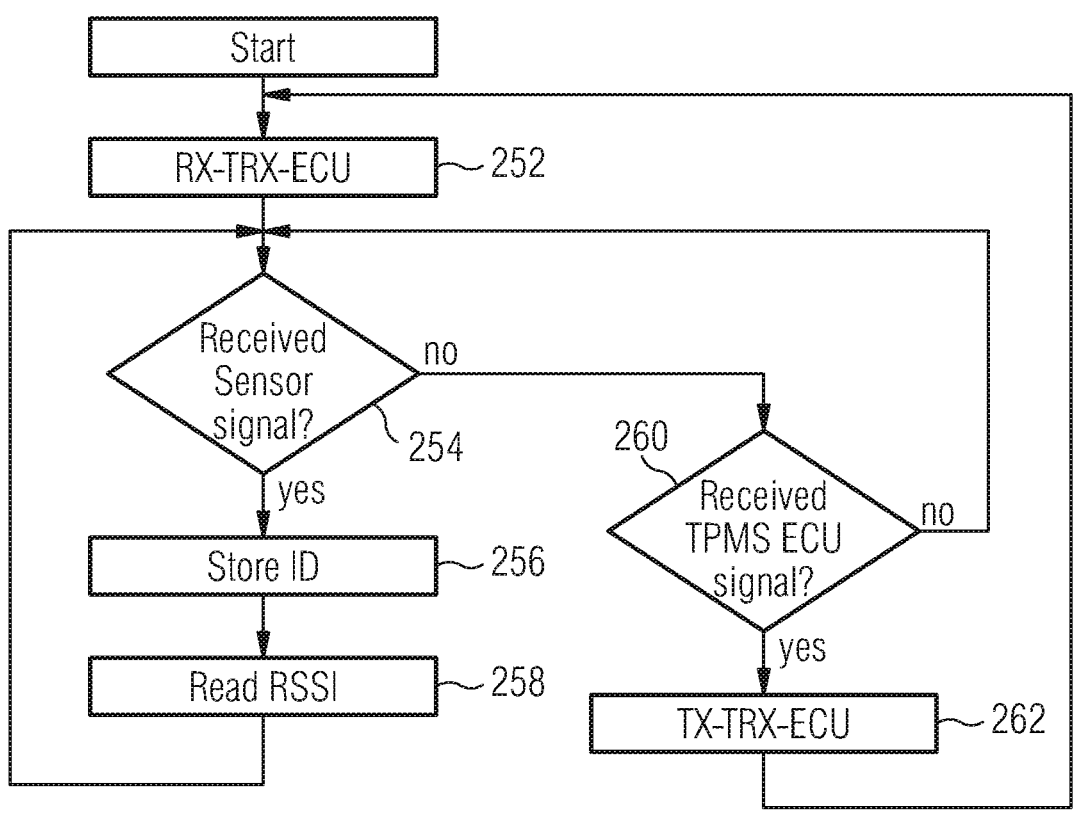
FIG. 10 shows a flowchart of a method for operating an RF repeater of the tire parameter monitoring system.

FIG. 10 shows a flowchart of a method 250 for operating the RF transceivers 102_1:102_4 of the TPMS 100. In a first step 252, the RF transceiver is switched to a receive mode. In a second step 254 the RF transceiver determines whether a sensor signal was received. If a sensor signal was received, then the RF transceiver proceeds to third step 254 in which the received ID is stored and a fourth step 256 in which a RSSI of the sensor signal is read, else the RF transceiver proceeds with a fifth step 260 in which it is determined whether a TPMS ECU signal (having a request to RF transceiver for localization) was received. If the TPMS ECU signal was received, then the RF transceiver is switched to a transmit mode in a sixth step 262, else it is proceeded with the first step 252.

In other words, FIG. 10 shows a TRX ECU flowchart for TPMS auto localization (TRX ECU SW). RF transceiver is configured as receiver (RX-TRX-ECU). RF transceiver checks if it receives sensor signal from TPMS sensor or TPMS ECU signal. If RF transceiver receives sensor signal, it stores sensor info, ID and RSSI. If it receives TPMS ECU signal, RF transceiver is configured for transmitting sensor ID, RF transceiver ID and tire information.

Figure 11:
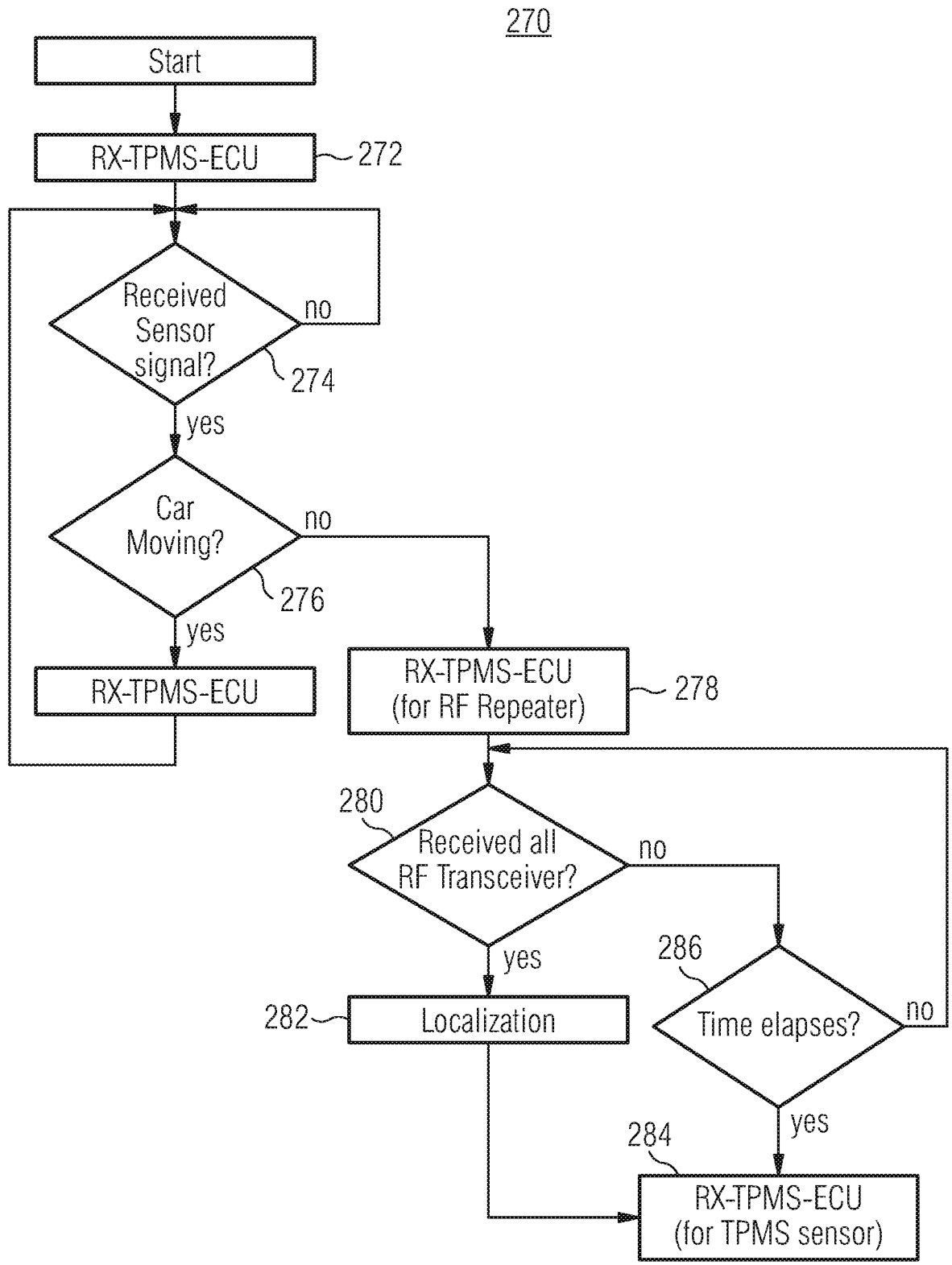
FIG. 11 shows a flowchart of a method for operating the control unit of the tire parameter monitoring system.

FIG. 11 shows a flowchart of a method 270 for operating the ECU 114 of the TPMS 100. In a first step 272, the TPMS ECU 114 is switched to a receive mode for receiving TPMS sensor signals. In a second step 274 the TPMS ECU 114 determines whether it received the TPMS sensor signals. If the TPMS sensor signals were not received, then the second step 274 is repeated, else it is proceeded to a third step 276 in which TPMS ECU 114 determines whether the car 108 is moving. If the car is moving, then TPMS ECU 114 is maintained in the receive mode and the second step 274 is repeated, else in a fourth step 278 the TPMS ECU 114 is switched to a receive mode for receiving RF repeater/transceiver signals. In a fifth step 280 the TPMS ECU 114 determines whether RF transceiver signals were received from all RF transceivers. If RF transceiver signals were received from all RF transceivers, then TPMS ECU 114 performs localization in a sixth step 282 and is switched in a seventh step 284 to a receive mode for receiving TPMS sensor signals, else TPMS ECU 114 determines in an eight step 286 whether a predefined time is elapsed. If the predefined time is elapsed, then TPMS ECU 114 is switched in the seventh step 284 to the receive mode for receiving TPMS sensor signals, else TPMS ECU 114 repeats the fifth step 280.

In other words, FIG. 11 shows a TPMS ECU flowchart for TPMS auto localization (TPMS ECU SW using RF receiver). TPMS ECU may use TDA5240 from Infineon or RF receiver. TPMS ECU 114 is configured for receiving TPMS sensor signal. Upon receiving TPMS sensor signal, TPMS ECU checks if car is moving. When car is moving, TPMS ECU displays received sensor signal for driver. TPMS ECU is configured for receiving RF transceiver signal. It performs localization if it successfully received signals from all RF transceivers. Otherwise, TPMS ECU is configured to receive TPMS sensor signals after time elapses.

FIG. 12 shows a flowchart of a method 300 for operating the RF transceivers (RF repeaters) of the TPMS 100. In a first step 302, the RF transceiver is switched to a receive mode for receiving TPMS sensor signals. In a second step 304, the RF transceiver determines whether the TPMS sensor signals were received. If the TPMS sensor signals were received, then the RF transceiver stores the IDs received with the TPMS sensor signals in a third step 306 and reads the RSSI of the TPMS sensor signals in a fourth step 308 and then proceeds again with the second step 204, else the RF transceiver determines in a fifth step 310 whether the car is moving. If the car is moving, then the RF repeater proceeds to the second step 304, else the RF repeater waits for a predetermined time (delay) in a sixth step 312 and is switched to a transmit mode in a seventh step 314 and proceeds again with the second step 304.

In other words, FIG. 12 shows a TRX ECU flowchart for TPMS auto localization (TRX ECU SW (RF receiver used for TPMS ECU)). TPMS RF repeater is configured as receiver (RX-TRX-ECU). RF Transceiver receives signal from TPMS sensors. Each RF transceiver stores sensor ID nearest to it. If the car is stationary or parked over a period, each RF transceiver transmits sensor ID to TPMS ECU.

Benefits of the TPMS auto localization described herein are the following. No expensive LF cabling is needed, but it has the same level of confidence like bi-directional TPMS localization systems. Further, a hardware implementation for tire localization is used. Moreover, no other vehicle signal (like WSS (Wheel Speed Signal)) are needed for localization. In addition, auto localization is done using the RF Transceiver so it does not affect power consumption of the TPMS sensor. Furthermore, the RF transceiver consumes less power as compared to that of an LF repeater. Further, wireless transmission is more reliable/consistent because the RF transceiver position is fixed in the car. Furthermore, the driver could send a request for tire information update. In addition, the cost of each RF transceiver module is lower than the cost of an LF repeater. Finally, it can be applied to after-market as well as to OEM market without limitation.

Figure 13A:
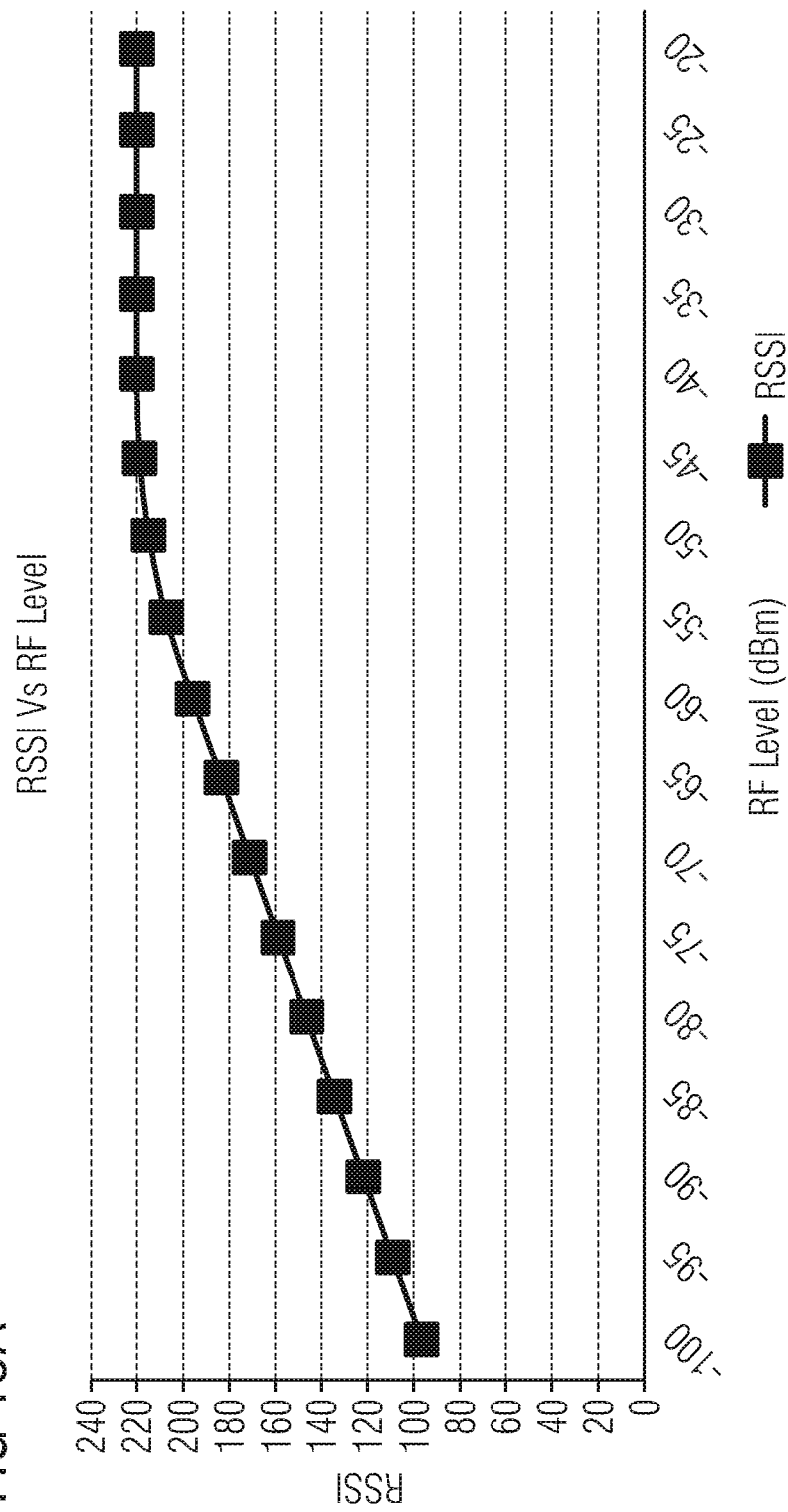
FIG. 13a shows in a diagram the received signal strength level in LSB plotted over an RF level in dBm.
Figure 13B:
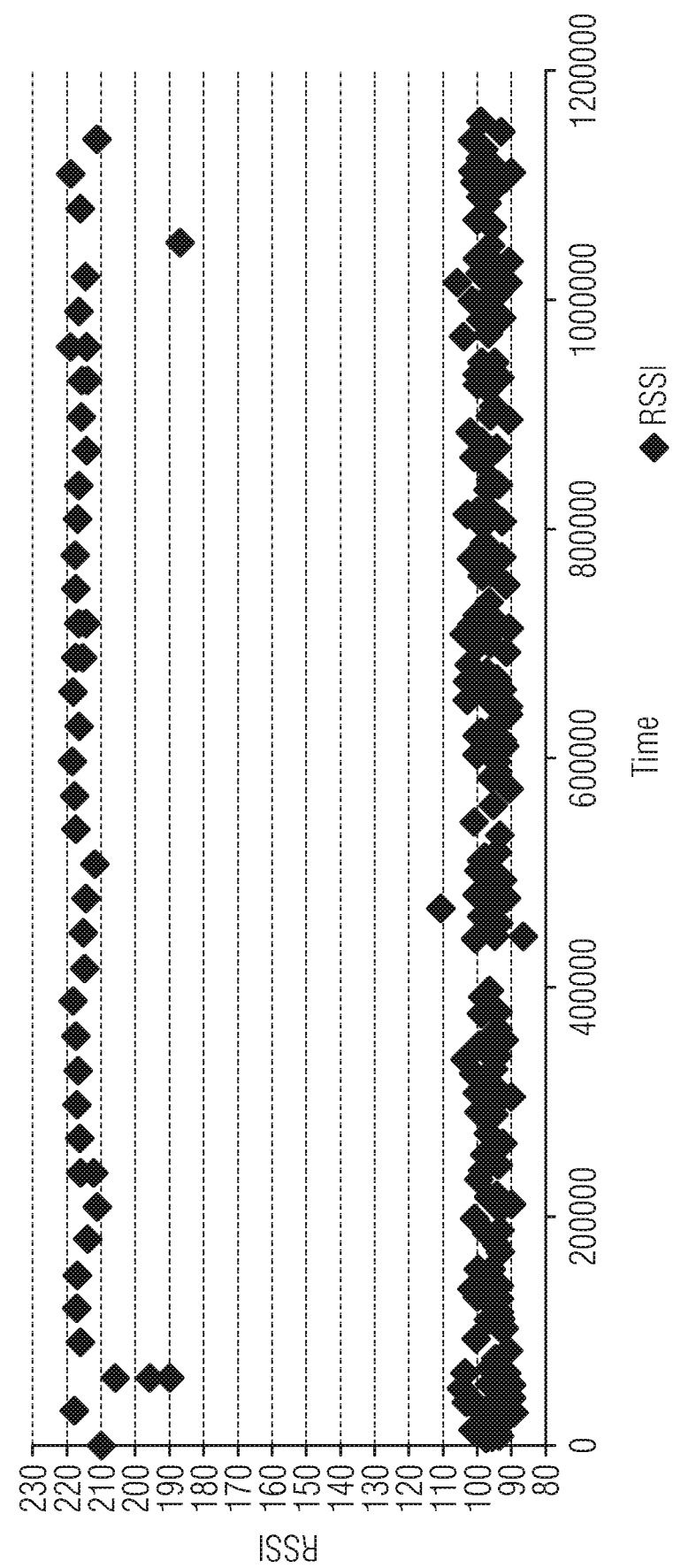
FIG. 13b shows in a diagram the received signal strength level in LSB plotted over time in ms when the car is moving.

FIG. 13a shows in a diagram the received signal strength level (RSSI) in LSB plotted over an RF level in dBm (RSSI vs. RF level), wherein FIG. 13b shows in a diagram the received signal strength level (RSSI) in LSB plotted over time in ms. For obtaining the measurement values shown in FIGS. 13a-13b, the TPMS auto localization system 100 is tested using the following hardware. The SP37 from Infineon as TPMS sensor and the IFX TDA5240 Board from Infineon as TPMS ECU/TPMS RF Repeater. The RSSI vs RF level graph shown in FIG. 13a shows linearity performance for TPMS ECU/TPMS RF repeater. Whenever RF receiver receives TPMS sensor signal, it records level of its received signal strength (RSSI). Based on strongest RSSI level, each RF Transceiver is able to determine its nearest TPMS sensor.

FIG. 14 shows a flowchart 400 of a method for updating a position of a wheel at a vehicle having a tire parameter monitoring system. The tire parameter monitoring system comprises a central unit and at least two sensor units attached to different wheels of the vehicle, wherein each of the at least two sensor units has a dedicated RF repeater. The method 400 comprises a step 402 of transmitting an RF repeater signal with each of the RF repeaters to the central unit, wherein the RF repeater signal comprises an identification of the RF repeater and an identification of the sensor unit the RF repeater is dedicated to. Further, the method 400 comprises a step 404 of receiving with the central unit the RF repeater signal of each of the RF repeaters and matching the identification of the sensor unit and the identification of the RF repeater with a known identification of the RF repeater.

FIG. 15 shows a flowchart of a method 500 for monitoring parameters of tires of a vehicle. The method 500 comprises a step 502 of transmitting a first sensor signal/data with a first sensor unit attached to a first wheel of the vehicle and transmitting a second sensor signal/data with a second sensor unit attached to a second wheel of the vehicle. The method 500 comprises a step 504 of retransmitting the first sensor signal/data with a first RF repeater which is dedicated to the first sensor unit and retransmitting the second sensor signal/data with a second RF repeater which is dedicated to the second sensor unit.

In embodiments, four RF transceivers with known positions (to TPMS ECU) receive TPMS sensor information (e.g., sensor ID and other tire information) from TPMS sensors and then transmit sensor ID and RF transceivers' IDs to TPMS ECU. For tire localization, TPMS ECU matches received sensor ID and each RF transceiver ID with known RF transceiver ID.

In embodiments, external hardware RF transceivers may be placed close to TPMS sensors. Each RF transceiver may receive signal for nearest TPMS sensor and transmit at least sensor ID and RF transceiver ID to TPMS ECU. Four RF transceivers can be used for localization purpose. Based on known position of RF transceiver, TPMS ECU can match received sensor ID and RF transceiver ID for localization purpose.

Although some aspects have been described in the context of an apparatus, it is clear that these aspects also represent a description of a corresponding method, where a block or device corresponds to a method step or a feature of a method step. Analogously, aspects described in the context of the method steps also represent a description of a corresponding block or item of a feature of a corresponding apparatus. Some or all of the method steps may be executed by (or using) a hardware apparatus.

The above described embodiments are merely illustrative of the principles of the present disclosure. It is understood that modifications and variations of the arrangements and the details described herein will be apparent to others skilled in the art. It is therefore the intent be limited only by the scope of the impending patent claims and not by the specific details presented by way of description and explanation of the embodiments herein.

The invention claimed is:

1. A tire parameter monitoring system, comprising:
   at least two sensor units;
   at least two RF repeaters;
   wherein each of the at least two RF repeaters is dedicated to an individual sensor unit of the at least two sensor units and dedicated to an individual wheel of a vehicle, and
   wherein each RF repeater is configured to receive sensor signal/data transmitted via RF by the corresponding sensor unit and retransmit the sensor signal/data in form of an RF repeater signal based on the corresponding sensor signal/data to a central unit of the tire parameter monitoring system.

2. The tire parameter monitoring system according to claim 1, wherein each RF repeater is configured to retransmit the corresponding sensor signal/data in form of the RF repeater signal in response to receiving an RF control signal from the central unit, the RF control signal comprising an information describing a request for retransmission.

3. The tire parameter monitoring system according to claim 1, wherein the sensor signal/data comprises an information describing a parameter of the wheel the sensor unit is attached to.

4. The tire parameter monitoring system according to claim 3, wherein the parameter of the wheel is at least one out of pressure, temperature, acceleration, battery voltage and sensor unit identification of a tire of the wheel.

5. The tire parameter monitoring system according to claim 4, wherein the RF repeater signal comprises the information describing the parameter of the wheel the corresponding sensor unit is attached to and an identification of the RF repeater.

6. The tire parameter monitoring system according to claim 5, wherein the central unit is configured to receive the RF repeater signal and to allocate the information describing the parameter of the wheel to a position of the wheel at the vehicle using the identification of the RF repeater.

7. The tire parameter monitoring system according to claim 6, wherein the sensor signal/data further comprises an identification of the sensor unit, and wherein the central unit is configured to allocate the information describing the parameter of the wheel to a position of the wheel at the vehicle by matching the identification of the sensor unit and the identification of the RF repeater with a known identification of the RF repeater.

8. The tire parameter monitoring system according to claim 7, wherein a position of the RF repeater is known to the central unit.

9. The tire parameter monitoring system according to claim 3, wherein each of the at least two RF repeaters is configured to store the parameter of the wheel received from the corresponding sensor unit and to transmit the RF repeater signal comprising the stored parameter of the wheel in response to receiving an RF control signal from the central unit, the RF control signal indicating a parameter update request.

10. The tire parameter monitoring system according to claim 9, wherein the central unit comprises an RF transceiver configured to transmit the RF control signal and to receive the RF repeater signal.

11. The tire parameter monitoring system according to claim 1, wherein each RF repeater is configured to only retransmit the sensor signal/data of the sensor unit the RF repeater is dedicated to.

12. The tire parameter monitoring system according to claim 11, wherein each RF repeater is configured to detect the sensor signal of the sensor unit the RF repeater is dedicated to based on a received signal strength.

13. The tire parameter monitoring system according claim 1, wherein a distance between one of the at least two wheel units and the corresponding RF repeater is smaller than a distance between the one of the at least two wheel units and the other RF repeater.

14. The tire parameter monitoring system according to claim 1, wherein each of the RF repeaters comprises a wireless transceiver.

15. The tire parameter monitoring system according to claim 1, wherein a number of RF repeaters is equal to a number of sensor units.

16. The tire parameter monitoring system according to claim 1, wherein each of the at least two sensor units comprises an RF transmitter.

17. The parameter monitoring system according to claim 1, wherein the at least two sensor units are attached to different wheels of a vehicle.

18. A method for updating a position of a wheel at a vehicle having a tire parameter monitoring system, the tire parameter monitoring system comprising a central unit and at least two sensor units attached to different wheels of the vehicle and at least two RF repeaters, wherein each of the at least two RF repeaters is dedicated to an individual sensor unit of the at least two sensor units and dedicated to an individual wheel of the vehicle, the method comprising:
   transmitting an RF repeater signal with each of the RF repeaters to the central unit, wherein the RF repeater signal comprises an identification of the RF repeater and an identification of the sensor unit the RF repeater is dedicated to; and
   receiving with the central unit the RF repeater signal of each of the RF repeaters and matching the identification of the sensor unit and the identification of the RF repeater with a known identification of the RF repeater.

19. A method for monitoring parameters of tires of a vehicle, the method comprising:
   transmitting a first sensor signal/data with a first sensor unit attached to a first wheel of the vehicle and transmitting a second sensor signal/data with a second sensor unit attached to a second wheel of the vehicle; and
   retransmitting the first sensor signal/data with a first RF repeater which is dedicated to the first sensor unit and to the first wheel of the vehicle and retransmitting the second sensor signal/data with a second RF repeater which is dedicated to the second sensor unit and to the second wheel of the vehicle.

20. A non-transitory storage medium comprising a computer program comprising instructions, when such instructions are executed by a processor perform a method for updating a position of a wheel at a vehicle having a tire parameter monitoring system, the tire parameter monitoring system comprising a central unit and at least two sensor units attached to different wheels of the vehicle and at least two RF repeaters, wherein each of the at least two RF repeaters is dedicated to an individual sensor unit of the at least two sensor units and to an individual wheel of the vehicle, the method comprising:
- transmitting an RF repeater signal with each of the RF repeaters to the central unit, wherein the RF repeater signal comprises an identification of the RF repeater and an identification of the sensor unit the RF repeater is dedicated to; and
- receiving with the central unit the RF repeater signal of each of the RF repeaters and matching the identification of the sensor unit and the identification of the RF repeater with a known identification of the RF repeater.

21. A non-transitory storage medium comprising a computer program comprising instructions, when such instructions are executed by a processor perform a method for monitoring parameters of tires of a vehicle, the method comprising:
- transmitting a first sensor signal/data with a first sensor unit attached to a first wheel of the vehicle and transmitting a second sensor signal/data with a second sensor unit attached to a second wheel of the vehicle; and
- retransmitting the first sensor signal/data with a first RF repeater which is dedicated to the first sensor unit and to the first wheel of the vehicle and retransmitting the second sensor signal/data with a second RF repeater which is dedicated to the second sensor unit and to the second wheel of the vehicle.

* * * * *